(12) United States Patent
Joo et al.

(10) Patent No.: US 9,552,023 B2
(45) Date of Patent: Jan. 24, 2017

(54) WEARABLE TERMINAL INCLUDING USER INPUT UNIT WITH CAMERA MODULE

(71) Applicant: LG Electronics Inc., Seoul (KR)

(72) Inventors: Wonseok Joo, Seoul (KR); Hanseok Chae, Seoul (KR); Seongyong Shin, Seoul (KR); Jangwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/588,012

(22) Filed: Dec. 31, 2014

(65) Prior Publication Data

US 2015/0189134 A1    Jul. 2, 2015

(30) Foreign Application Priority Data

Jan. 2, 2014  (KR) .......... 10 2014 0000116
Dec. 11, 2014  (KR) .......... 10 2014 0178147

(51) Int. Cl.
*G06F 1/16* (2006.01)
*H04B 1/3827* (2015.01)

(52) U.S. Cl.
CPC ........... *G06F 1/1686* (2013.01); *G06F 1/163* (2013.01); *H04B 2001/3861* (2013.01); *H04M 2250/20* (2013.01)

(58) Field of Classification Search
CPC .............. G06F 1/1686; G06F 1/163; H04B 2001/3861; H04M 2250/20
See application file for complete search history.

(56) References Cited

U.S. PATENT DOCUMENTS

| 6,809,774 B1 | 10/2004 | Yamazaki et al. |
| 7,084,919 B2 * | 8/2006 | Shibata ............... H04M 1/021 348/333.06 |
| 8,185,170 B2 * | 5/2012 | Itoh ............... G06F 1/1616 455/566 |
| 2001/0011025 A1 | 8/2001 | Ohki et al. |
| 2011/0157046 A1 * | 6/2011 | Lee ............... G04G 21/08 345/173 |
| 2014/0139637 A1 * | 5/2014 | Mistry ............... H04N 5/2252 348/46 |

FOREIGN PATENT DOCUMENTS

| EP | 1621965 A1 | 2/2006 |
| EP | 2071812 A1 | 6/2009 |

OTHER PUBLICATIONS

Search Report of European Patent Office in Appl'n No. 14200428.2, dated Sep. 14, 2015.

* cited by examiner

*Primary Examiner* — Gevell Selby
(74) *Attorney, Agent, or Firm* — Dentons US LLP

(57) ABSTRACT

A mobile terminal includes a main body case, a user input unit configured to detect an input of a control command in a manner that one side of the user input unit is arranged to a side of the main body case and a controller configured to control according to the control command detected by the user input unit. The user input unit includes a rotatable input unit housing combined with the side of the main body case, a rotation detection unit configured to detect a rotation of the input unit housing and deliver a rotation input to the controller and a camera module mounted on the input unit housing. The mobile terminal can expand an input function using a stem button.

14 Claims, 29 Drawing Sheets (a)

(b)

(a)

(b)

WEARABLE TERMINAL INCLUDING USER INPUT UNIT WITH CAMERA MODULE

This application claims priority to Korean Patent Application No. 10-2014-0000116 filed on Jan. 2, 2014 in Korea and Korean Patent Application No. 10-2014-0178147 filed on Dec. 11, 2014 in Korea, the entire contents of which is hereby incorporated by reference in its entirety.

BACKGROUND OF THE INVENTION

Field of the Invention

The present invention relates to a mobile terminal of which internal space utilization of the mobile terminal is enhanced by being equipped with a camera on a user input unit.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

In particular, such a mobile terminal capable of being worn on a body of a user as a sunglass type and a watch type mobile terminal are recently appearing to increase convenience of portability and widen a range of use. Since the watch type mobile terminal is worn on a wrist, the watch type mobile terminal can be commonly used like a watch.

SUMMARY OF THE INVENTION

Accordingly, the present invention is directed to an apparatus and method thereof that substantially obviate one or more problems due to limitations and disadvantages of the related art. An object of the present invention is to provide a mobile terminal equipped with a camera on a user input unit.

To achieve these objects and other advantages and in accordance with the purpose of the invention, as embodied and broadly described herein, according to one embodiment, a mobile terminal includes a main body case, a user input unit configured to detect an input of a control command, and arranged to a side of the main body case and a controller configured to control according to the control command detected by the user input unit. The user input unit includes a rotatable input unit housing combined with the side of the main body case, a rotation detection unit configured to detect a rotation of the input unit housing and deliver a rotation input to the controller and a camera module mounted on the input unit housing.

One side of the input unit housing is inserted into a button hole formed on the side of the main body case and the input unit housing rotates along an insertion direction as rotational axis.

The mobile terminal can include a camera connector configured to be connected with the camera module, and extended to the inside of the main body by passing through a button hole using another end of the camera connector and a camera flexible board configured to connect the camera connector and the controller with each other.

The mobile terminal can further include a key housing of a cylinder shape combined with the input unit housing in the inside of the main body. The camera flexible board is configured to spirally wind up external of the key housing, and having one end connected with extended end of the camera connector another end connected with the controller using another end of the camera flexible board.

The rotation detection unit includes a magnet disk combined with an end of the input unit housing, the magnet disk on which a north polar magnet and a south polar magnet are alternately arranged according to a circumference of the magnet disk, the magnet disk rotating together with a rotation axis of the input unit housing and a magnetic sensor configured to detect change of a magnetic field according to a location change of the south polar magnet and the north polar magnet when the magnet disk rotates. The controller can calculate a rotation angle and the number of rotation of the input unit housing based on the change of the magnetic field detected by the magnetic sensor.

If pressure is applied to the input unit housing in an insertion direction, the input unit housing can be inserted into the main body case. The input unit housing can further include a push detection unit configured to deliver a push input to the controller when the input unit housing is inserted into the main body case.

The push detection unit corresponds to a tact switch positioned in the vicinity of an end of the input unit housing. If pressure is applied to the input unit housing in the insertion direction, the end of the input unit housing pushes the tact switch and a signal can be generated.

The mobile terminal further includes a touch sensor configured to be positioned at a position opposite to a position of a button hole of the main body case. If the touch sensor detects a body contact, the controller can activate the push detection unit.

The mobile terminal further includes a locking protrusion formed on a circumference of one side of the input unit housing and a first locking groove to which the locking protrusion is inserted in the inside of a button hole. A size of the first locking groove is greater than a size of the locking protrusion toward the insertion direction of the input unit housing and the locking protrusion can move in the inside of the first locking groove according to a movement of the input unit housing.

The mobile terminal further includes a second locking groove formed on the button hole in the vicinity of the first locking groove and a height of a protruding part between the first locking groove and the second locking groove can be configured to be smaller than a depth of the locking groove.

The mobile terminal further includes a location sensor configured to detect whether the locking protrusion is positioned at the first locking groove or the second locking groove. If the location sensor detects that the locking protrusion is positioned at the second locking groove, the controller can activate a camera.

The mobile terminal can further include a metal dome configured to be positioned at outer end of the input unit housing, a cover button configured to be combined with outer end of the input unit housing and configured to apply pressure to the metal dome when pressure is applied in the insertion direction of the input unit housing, a button switch configured to generate a signal when the pressure is applied to the metal dome and a button cable configured to deliver the signal generated by the button switch in a manner that one end of the button cable is connected with the button switch and another end of the button cable is connected with a camera flexible board via the input unit housing.

The mobile terminal can further include a magnet disk on which a north polar magnet and a south polar magnet are alternately arranged according to a circumference of the magnet disk, the magnet disk combined with the inside of the cover button, the magnet disk rotates together with the cover button when the cover button rotates and a magnetic sensor configured to detect change of a magnetic field according to a location change of the south polar magnet and the north polar magnet when the magnet disk rotates. The controller can calculate a rotation angle and the number of rotation of the cover button based on the change of the magnetic field detected by the magnetic sensor.

The mobile terminal can further include an auxiliary button configured to be inserted rotatable into the side of the main body case, the auxiliary button capable of moving in an insertion direction of the auxiliary button within a prescribed range and rotating along an insertion direction of the auxiliary button as rotational axis. The auxiliary button can further include a rotation detection unit configured to detect a rotation and a push detection unit configured to detect the insertion direction of the auxiliary button. If the rotation detection unit detects the rotation of the auxiliary button in a state that a camera is activated, the controller adjusts a focus of the camera. If the push detection unit detects that pressure is applied to the auxiliary button in the insertion direction, the controller can store an image inputted by the camera.

To further achieve these objects and other advantages and in accordance with the purpose of the invention, as embodied and broadly described herein, according to a different embodiment, a mobile terminal includes a main body case, a pair of hinge axes of which both ends are inserted into both sides of the main body case and a pair of bands including a hinge hook combined with the hinge axis of one side. The hinge hook includes a mounting part of a ring shape wrapping a circumference of the hinge axis and an entrance of which one side of the mounting part is opened and the entrance and a direction to which the band is extended form an angle less than 90 degrees.

The entrance of the hinge hook can further include a protruding unit becoming narrower as getting close to the mounting part and is widened again at the mounting part.

A center of the entrance and a center of the mounting part may not be on an identical straight line.

The mobile terminal can include a conductive material and the hinge axis can further include an access unit configured to connect both ends of the hinge axis and the controller with each other.

The conductive material is exposed to the mounting part of the hinge hook. The controller execute a specific function according to a resistance change between the access units when the hinge hook is connected with the hinge axis, The conductive material can further include a reinforced mold, which is exposed to a surface of the mounting part of the hinge hook and not exposed to an outside surface of the hinge hook, and an internal resistance unit positioned at the inside of the band.

The hinge axis includes a first hinge axis arranged in an axis direction in parallel and a second hinge axis. The access unit includes a first access unit connected with one end of the first hinge axis and a second access unit connected with another end of the second hinge axis. It may further include a separation unit positioned between the first hinge axis combining another end of the first hinge axis and one end of the second hinge axis with each other and the second hinge axis.

To further achieve these objects and other advantages and in accordance with the purpose of the invention, as embodied and broadly described herein, according to a further different embodiment, a mobile terminal includes a mounting part, a band worn on a wrist of a user in a manner of being extended in a first direction, a main body including a curved surface of which a center of the curved surface is convex in the first direction, a plurality of printed circuit boards arranged to the inside of the main body case in a manner of being separated from each other in a first direction and a flexible board connecting each of a plurality of the printed circuit boards with each other.

The mobile terminal further includes a camera module of a cylinder shape combined with one edge of the main body in a manner of being able to rotate on the basis of a second direction, which is orthogonal to the first direction. The camera module can include a housing of a cylinder shape, a camera of a lens positioned at an opening, which is formed on a side of the housing and a shaft. One side of the shaft is positioned at the inside of the main body and another side of the shaft is positioned at the housing. The shaft makes the housing relatively rotate in response to the main body.

The camera module can further include a sensor configured to detect whether the shaft is rotated in a manner of being mounted on the inside of the main body.

When pressure is applied to the camera module in the second direction, the camera module is pushed. It may further include a switch configured to generate a signal in a manner of being positioned at an end of the shaft when the pressure is applied to the camera module in the second direction.

The mobile terminal can further include a locking protrusion protruded from the shaft, a supporting unit positioned at a circumference of the shaft of the inside of the main body and a flat spring positioned between the supporting unit and the locking protrusion.

The mobile terminal can further include a plurality of batteries arranged in a curved surface direction of the main body.

The main body can be extended in an arm direction from a mounting part of the strap.

The mobile terminal can further include an auxiliary battery mounted on the strap and an access terminal positioned at the mounting part and electronically accessing the main body.

According to at least one or more embodiments of the present invention, an input function can be expanded using a step button of a mobile terminal. And, the number of parts mounted on a main body can be reduced in a manner of mounting a camera module on the stem button. Since a band is easily replaceable, a band can be replaced according to a mood of a user or a request of a user. In case of replacing a band with a different band, it is able to execute an appropriate function by identifying a purpose of the different band, thereby increasing user convenience.

Since a shape of a main body corresponds to a curved surface, wearing sensation is enhanced and a size of a display unit can be enlarged. And, a function of a mobile terminal can be expanded in a manner of enlarging a display unit by expanding a size of a main body and securing a bigger electronic apparatus unit.

Since a main body is removable from a band, convenience is increased in case of making a call or capturing a picture and utilization of the mobile terminal can be increased.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
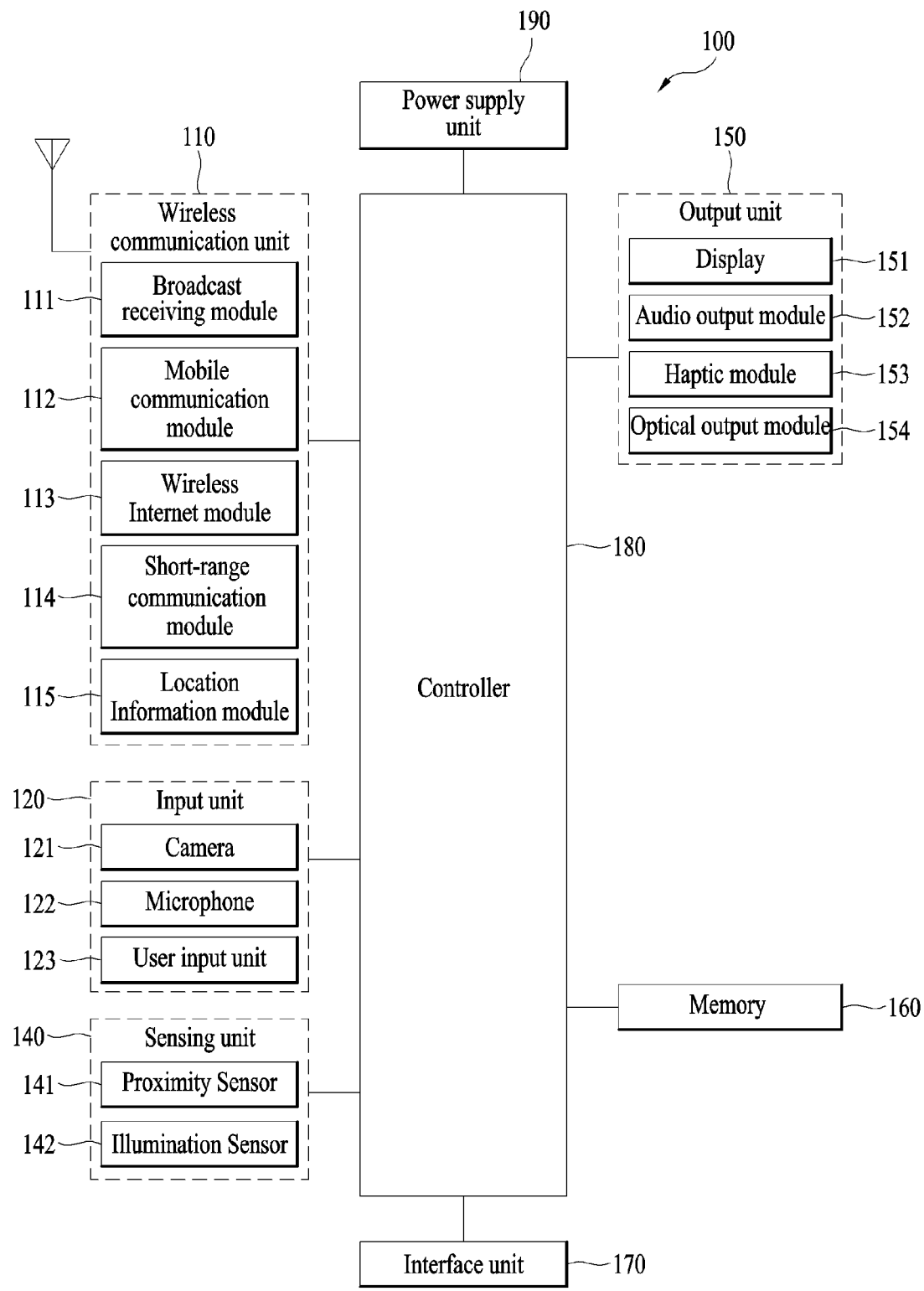
FIG. 1 is a block diagram of a mobile terminal in accordance with the present disclosure.

Reference is now made to FIG. 1, where FIG. 1 is a block diagram of a mobile terminal in accordance with the present disclosure The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Figure 2:
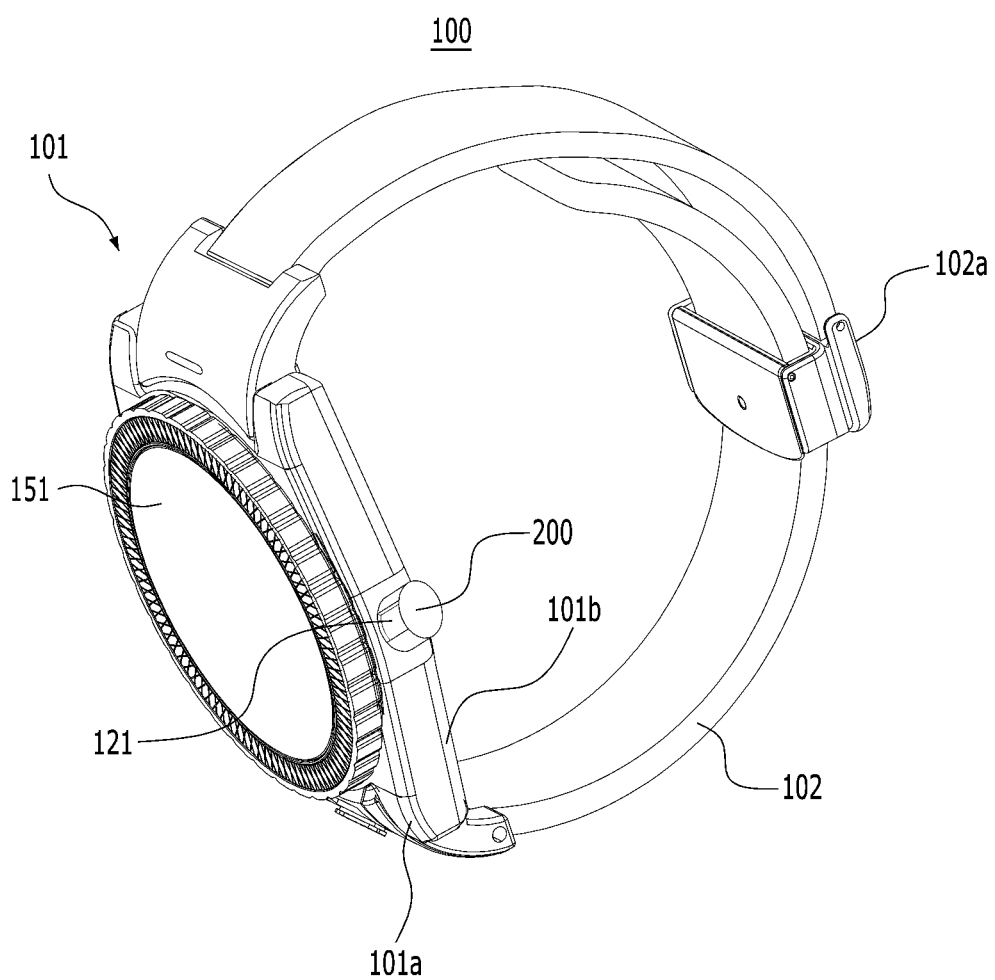
FIG. 2 is conceptual view of one example of the mobile terminal, viewed from different direction.

FIG. 2 is a perspective diagram for an example of a mobile terminal 100 according to the present invention viewed from one direction. The mobile terminal 100 includes a main body 101 on which a display unit 151 is mounted and a band 102 combined with both ends of the main body 101.

The main body 101 includes an electronic apparatus unit on which an electronic part is mounted in the inside of the main body. The electronic apparatus unit can be formed by a combination of a first case 101a and a second case 101b, by which the present invention may be non-limited. The mobile terminal 100 of uni-body may be implemented in a manner that one case is configured to arrange an internal space.

A main board, which is in charge of control of the mobile terminal 100, a battery 191 configured to supply power, such a sensor as a proximity sensor, an acceleration sensor and the like and various electronic parts are mounted on the electronic apparatus unit.

The electronic apparatus unit of the mobile terminal 100 can be equipped with an antenna to perform wireless communication. Meanwhile, performance of the antenna can be expanded using a case. For instance, a ground area or a radiation area can be configured to be expanded in a manner that a case including a conductive material is electronically connected with the antenna.

A display unit 151 can be placed at a front side of the main body 101 to output information. The display unit 151 can be implemented as a touch screen in a manner of installing a touch sensor in the display unit 151. As shown in FIG. 2, a window 151a of the display unit 151 is installed in the first case 101a and may form a front side of a terminal body together with the first case 101a.

The main body 101 can include an audio output unit 151, a camera 121, a microphone 122, a user input unit 123 and the like. In case of implementing the display unit 151 as a touch screen, the display unit may function as the user input unit 123. In doing so, a separate key may not be installed in the main body 101.

The mobile terminal 100 is worn on a wrist and is configured to enfold the wrist. The mobile terminal can be made up of a flexible material to make a user easily wear the mobile terminal. As an example, a band 102 can be made up of leather, rubber, silicon, synthetic resin material and the like. And, the band 102 is configured to be removable from a main body 101. Hence, the band can be configured to be replaced with a band of various forms according to a preference of the user.

Meanwhile, the band 102 can be used to expand performance of an antenna. For instance, the band can be equipped with a ground expansion unit (not depicted) used for expanding a ground area in a manner of being electronically connected with an antenna.

The band 102 can be equipped with a buckle 102a. The buckle 102a connects both ends of a pair of bands combining one side of a main body 101 and another side of the main body 101 with each other. The buckle forms a ring shape together with the band and the main body 101. A pair of the bands is separated from each other using the buckle 102a and the mobile terminal 100 is fixed on a wrist of a user by binding up the buckle 102a.

A stem button 200 protruding from a side of a main body is one example of a user input unit. The mobile terminal is controlled by rotating or pushing the stem button 200. As shown in FIG. 2, although the stem button has a form of protruding from a side of the main body, the stem button may have a form of not protruding in a manner of being positioned at an edge of a mobile terminal including a main body of a rectangular form.

Figure 3:
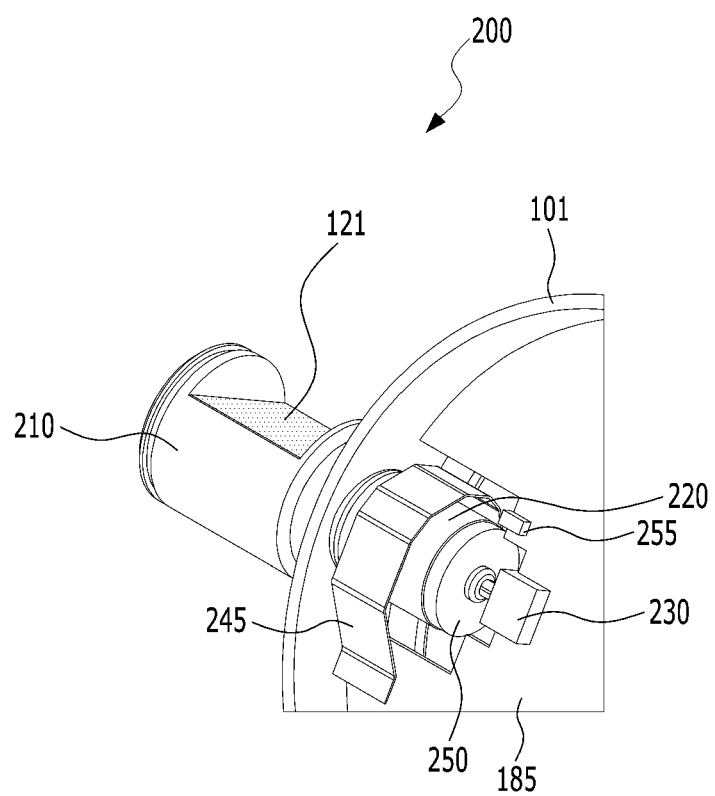
FIG. 3 is a perspective diagram for one embodiment of a stem button of a mobile terminal according to the present invention.
Figure 4:
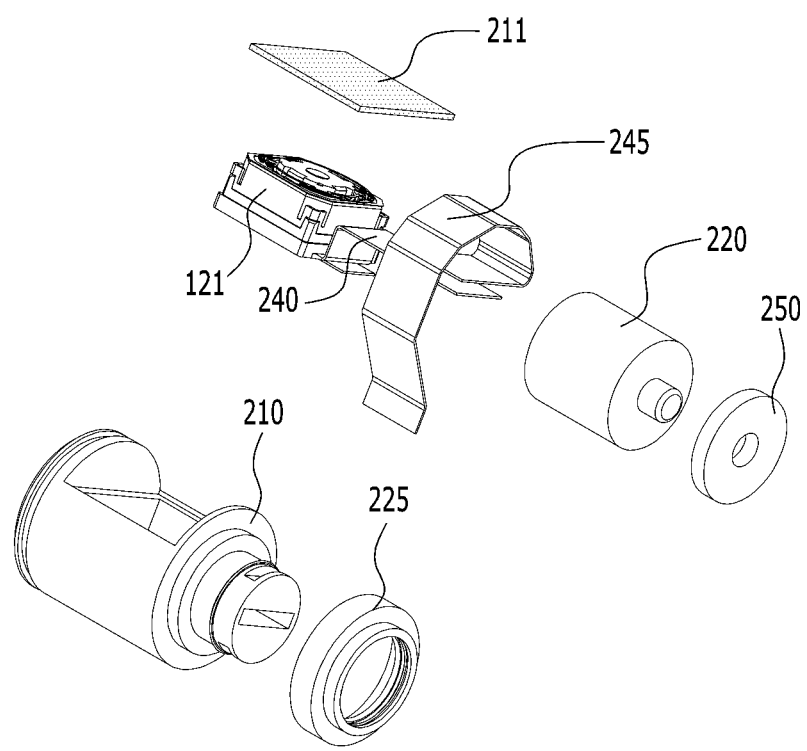
FIG. 4 is a disassembled perspective diagram for one embodiment of a stem button of a mobile terminal according to the present invention.

FIG. 3 is a perspective diagram for one embodiment of a stem button 200 of a mobile terminal 100 according to the present invention and FIG. 4 is a disassembled perspective diagram for one embodiment of a stem button 200 of a mobile terminal 100 according to the present invention.

Referring to FIG. 3, a stem button 200 according to the present invention includes an input unit housing 210 of a cylinder shape and one side of the input unit housing 210 is inserted into a button hole which is formed on a main body 101. A direction in which the input unit housing is inserted corresponds to a direction of a center axis of the cylinder of the input unit housing 210. The stem button 200 rotates on the basis of the center axis of the cylinder as a rotation axis.

A part, which is inserted into the button hole of the input unit housing 210, is positioned at an internal electronic apparatus unit of a case of the main body 101.

The input unit housing 210 is equipped with a camera module 121. As shown in FIG. 4, the input unit housing is equipped with a camera module 121 mounting part on which the camera module 121 is capable of being mounted. The camera module 121 can be positioned at the camera module mounting part. A camera connector 240 extended to one direction of the input unit housing 210 includes a plurality of signal wires configured to deliver image information inputted from the camera module 121 or a control command controlling zoom-in, zoom-out or capturing of the camera module 121.

Since the camera connector 240 rotates together according to a rotation of the input unit housing 210, it is difficult to maintain a state of being accessed with a main board 185, which is fixed on an electronic apparatus unit. Hence, the camera connector 240 is connected with the main board 185 using a camera flexible board 245. As shown in FIG. 4, one side of the camera flexible board is combined with the camera connector 240 and another side of the camera flexible board is connected with the main board 185 as shown in FIG. 3.

The camera flexible board 245 is spirally wound on the basis of a rotation axis of the input unit housing 210. Since the camera flexible board 245 is made up of a ductile material, the extent (number) of winding the camera flexible board 245 may change when the input unit housing 210 rotates. The camera flexible board 245 is implemented in a manner of forming a conductive pattern on an insulation film of a ductile material. Or, as shown in FIG. 3 and FIG. 4, the camera flexible board can be implemented in a form of a joint capable of being bent by constructing the camera flexible board with a plurality of hard boards and constructing joint parts of each of a plurality of the hard boards with a ductile material.

It may further include a key housing 220 of a cylinder shape which is combined with one side of the input unit housing 210 to make the camera flexible board 245 play a role of a winding reel. It may further include a key bracket 225 to fix the key housing 220 to the input unit housing 210.

As shown in FIG. 4, a diameter of a part of the input unit housing 210, which is inserted into a button hole of a case of a main body 101, is smaller than a diameter of a part exposed to an outside of the main body 101. The button hole has a size corresponding to a size of a smaller diameter. It may further include a camera window 211 positioned at the front of a lens to protect the lens of a camera module 121.

A tact switch 230 corresponds to one example of a push detection unit configured to detect a push input of a stem button 200. The tact switch is positioned at an end of the input unit housing 210. If pressure is added to the input unit housing 210 in a direction of which the input unit housing 210 is inserted into the button hole, the tact switch 230 is pushed and a push signal is generated.

An embodiment of generating a push signal can be implemented in such various forms as a pogo pin, a dome button and the like as well as the tact switch 230 positioned at an end of the input unit housing 210.

Figure 5:
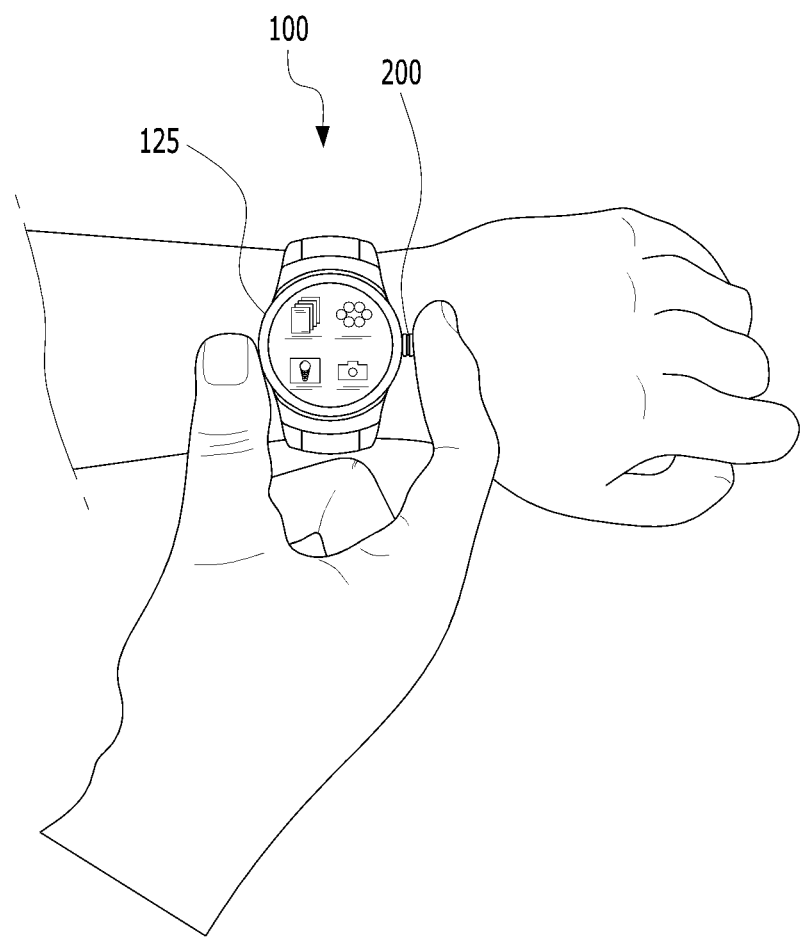
FIG. 5 is a diagram for one embodiment of a state of using a mobile terminal according to the present invention.

FIG. 5 is a diagram for one embodiment of a state of using a mobile terminal 100 according to the present invention. FIG. 5 shows a figure that a right hand of a user operates the mobile terminal 100 when the user pushes a stem button 200 of the mobile terminal 100 while wearing the mobile terminal on a left arm.

In order for a user to push a stem button 200 positioned at one side of the mobile terminal 100, the user should support another side of the mobile terminal 100 as shown in FIG. 5. In this case, if a touch sensor 125 is installed in another side of the mobile terminal, a signal generated by pushing a tact switch 230 can be recognized as a valid value only when a touch of the user detected by the touch sensor 125 and pushing the stem button 200 are performed at the same time.

This is intended to prevent an unintended push input from being occurred in case of pushing the stem button 200 with the back of a hand of the arm on which the mobile terminal is worn. In particular, it is able to distinguish an invalid push input from a valid push input using the stem button 200 and the touch sensor 125 positioned at an opposite side.

It may further include a rotation detection unit 250/255 configured to detect a rotation of the input unit housing 210. The rotation detection unit 250/255 detects whether the input unit housing 210 is rotated, the number of rotation and rotation direction and may be able to control the mobile terminal 100 according to whether the input unit housing 210 is rotated, the number of rotation and the rotation direction.

For instance, if the rotation detection unit 250/255 detects that the input unit housing 210 is rotating in a first direction, the controller 180 enlarges a screen of the display unit 151 or increases volume of the audio output unit 152. If the rotation detection unit 250/255 detects that the input unit housing 210 is rotating in a direction opposite to the first direction, the controller can reduce the screen of the display unit 151 or decrease the volume of the audio output unit 152. In this case, a rotation range of the input unit housing 210 can be restricted in consideration of a length of a camera flexible board 245.

As shown in FIG. 3 and FIG. 4, the rotation detection unit 250/255 includes at least one selected from the group consisting of a magnet disk 251 positioned at an end of a key housing 220, a saw tooth disk 253 and a wing 256 rotation plate 255 including a plurality of wings 256. The rotation detection unit 250/255 can consist of a sensor configured to detect a rotation of the magnet disk 251, the saw tooth disk 253 or the rotation plate 255.

Figure 6:
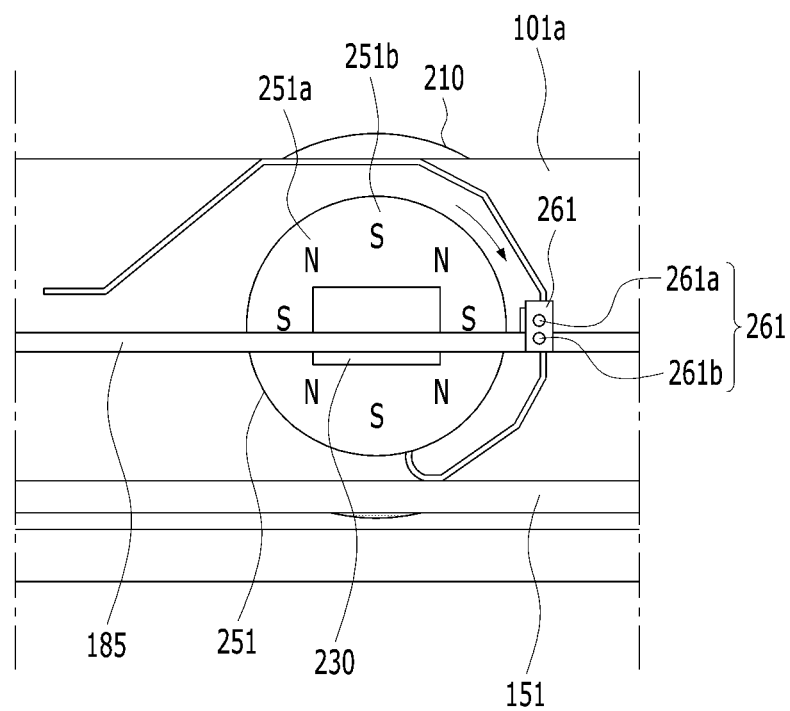
FIGS. 6, 7(a), 7(b), 8(a) and 8(b) are diagrams for various embodiments of a rotation detection unit of a stem button of a mobile terminal according to the present invention.
Figure 7:
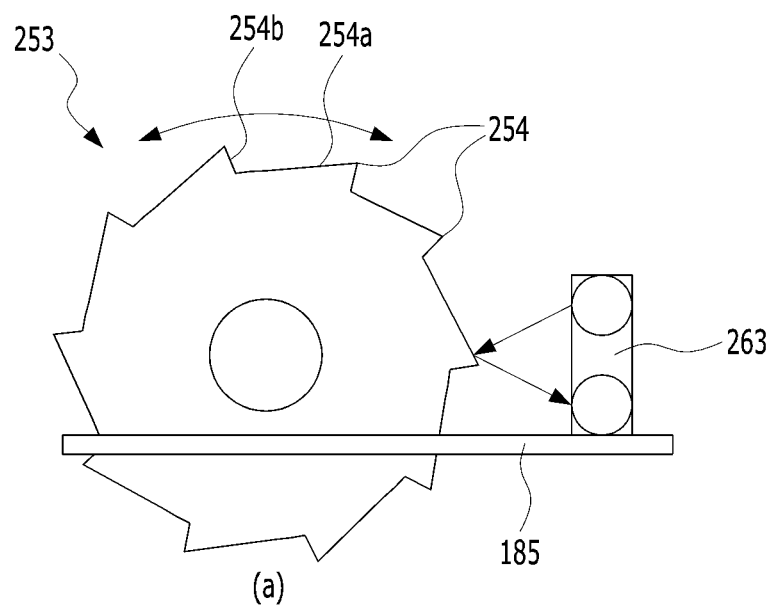
Figure 7:
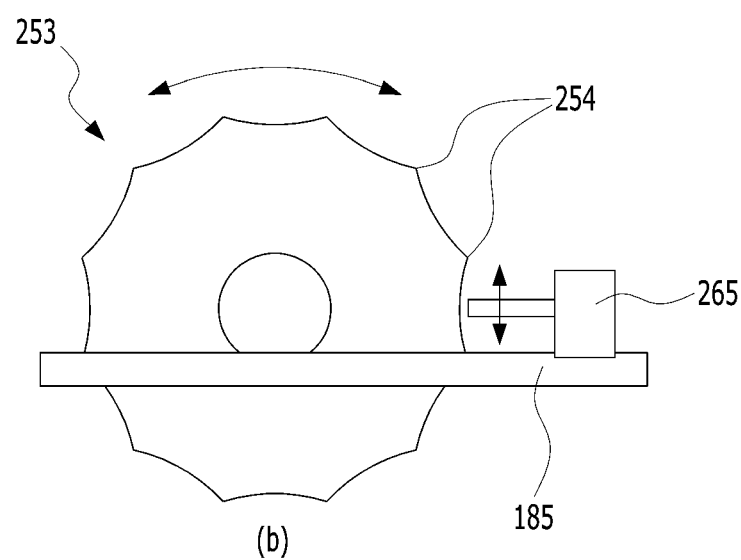
Figure 8:
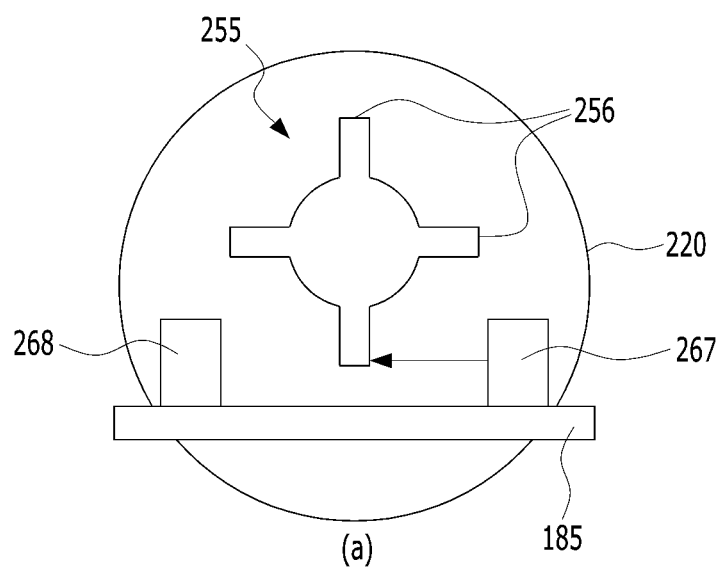
Figure 8:
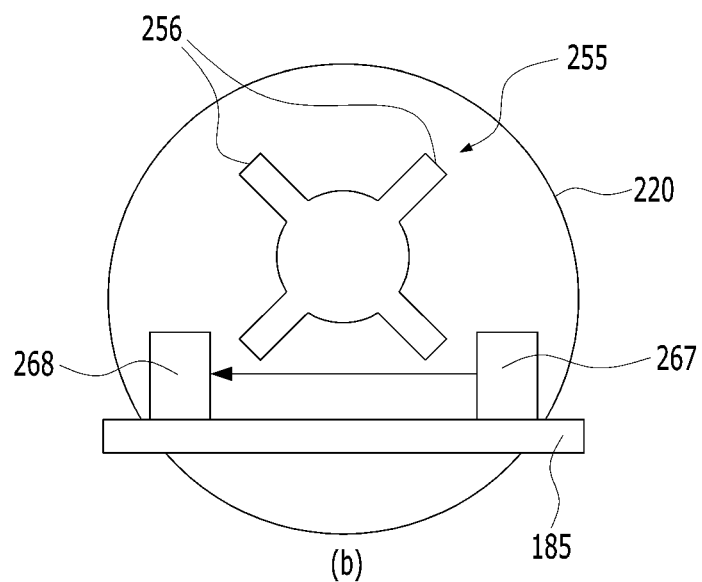

FIGS. 6 to 8 are diagrams for various embodiments of a rotation detection unit 250/255 of a stem button 200 of a mobile terminal 100 according to the present invention. FIG. 6 shows a magnet disk 251 as a rotation detection unit 250/255 and a magnetic sensor 261. A north polar magnet 251a and a south polar magnet 251b are alternately arranged according to a circumference of the magnet disk 251 and rotate together in accordance with a rotation of the input unit housing 210.

When the magnet disk 251 rotates, a position of the south polar magnet 251b and a position of the north polar magnet 251a are changed and the magnetic sensor 261 detects a change of a magnetic field. As shown in FIG. 6, if 4 north polar magnets 251a and 4 south polar magnets 251b are alternately arranged, it is able to check that the magnetic disk moves as much as 45 degrees whenever the position of the south polar magnet 251b and the position of the north polar magnet are changed.

If the number of the magnets 151a/251b is further increased, it is able to detect a more delicate angle change. And, when a south polar magnet 251b or a north polar magnet 251a is equipped in the vicinity of the magnet disk 251, if the north polar magnet 251a or the south polar magnet 251b of the magnet disk 251 is adjacent to the south polar magnet 251b or the north polar magnet 251a, movement of the magnet disk 251 can be restricted. If power stronger than gravitation between magnets is given, the magnet disk may rotate. A user is able to feel the extent of rotation using a magnet restricting the movement of the magnet disk 251.

FIG. 7 is a diagram for an embodiment including a saw tooth disk 253 and a proximity sensor 263 or a switch 265.

Referring to FIG. 7 (a), a bump 254 is formed on a circumference of a saw tooth disk 253. It may use a proximity sensor 263 configured to detect the bump 254 of the disk in a manner of shooting out such an electromagnetic wave as infrared ray.

In this case, the bump 254 can be formed by a shape of which a distance change from a center has a continuous value rather than a shape of which a stair gap is formed. In case of using a bump 254 of a continuous shape, since a distance change detected by the proximity sensor 263 is continuously coming out, a rotation angle of a stem button 200 can be more precisely detected.

For instance, the proximity sensor 263 detects a distance change of a saw tooth disk including 12 convex units and 12 concave units. An angle change changing from a state of a longest distance (a state of being adjacent to a concave unit) to a state of a shortest distance (a state of being adjacent to a convex unit) becomes 15 degrees. The proximity sensor 263 can detect a rotation angle and a rotation speed of the input unit housing 210 by detecting a distance change to the bump 254 of the saw tooth disk 253 according to the rotation of the input unit housing 210. In this case, if a first direction slope 254a of the bump 254 and a second direction slope 254b of the bump 254 are different from each other, it may be able to detect a rotation direction as well.

Or, as shown in FIG. 7 (b), instead of the proximity sensor 263, it may use a switch 265. One end of the switch is in contact with the bump 254 and another end of the switch includes a bar combined with a hinge. One end of the bar is stuck according to a height of the bump 254 and is separated from an end of the bump 254. This operation is repeated. The repeated operation is detected by another end of the switch. By doing so, rotation of the input unit housing 210 can be detected.

As shown in FIG. 8, it may use a rotation plate combined with a key housing 220 and including wings 256 and an optical sensor including a light receiving unit and a light emitting unit. As shown in FIG. 8 (a), if a light shoot from the light emitting unit 267 is blocked by the wing 256 positioned between the light receiving unit 268 and the light emitting unit 267, the light receiving unit 268 is unable to detect the light shoot from the light emitting unit 267. And, as shown in FIG. 8 (b), if the wing 256 is not positioned between the light receiving unit and the light emitting unit, the light receiving unit 268 is able to detect the light shoot from the light emitting unit 267.

A rotation of the input unit housing 210 can be detected according to whether a light is detected by the light receiving unit 268. If the number of wings 256 increases, it may detect a more delicate rotation angle.

Figure 9:
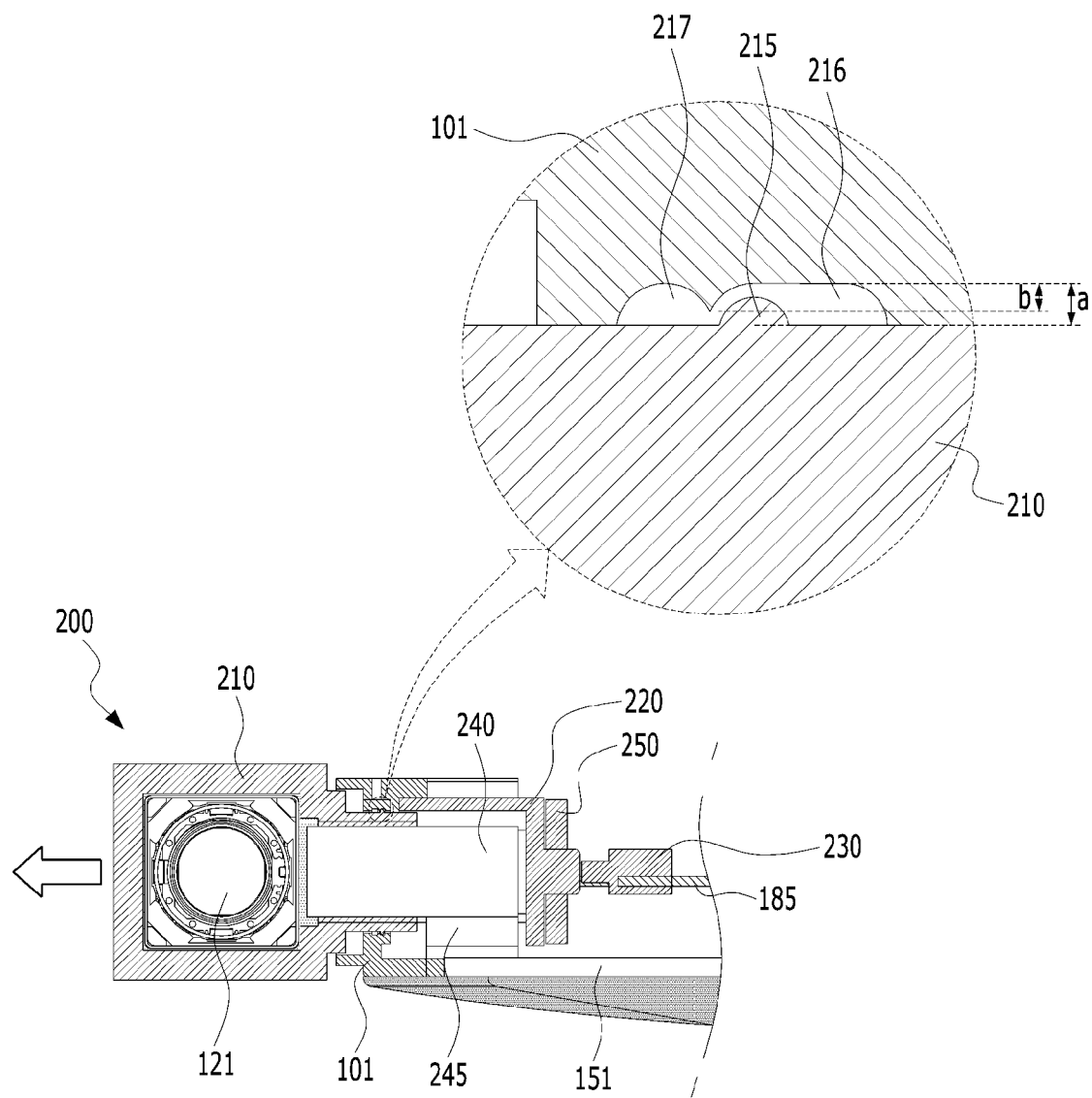
FIG. 9 is a cross section diagram for one embodiment of a structure fixing a stem button of a mobile terminal to a main body case according to the present invention.

FIG. 9 is a cross section diagram for one embodiment of a structure fixing a stem button 200 of a mobile terminal 100 to a main body 101 case according to the present invention. When the stem button 200 is used as a user input unit 123, if a user applies pressure to the stem button 200 in an insertion direction, the stem button is pushed. If the user releases the pressure, the stem button returns to an original position. The stem button is able to return to the original position by power of a resilient member installed in a tact switch 230. In order to prevent the input unit housing 210 from being dropped out of a button hole, a first locking groove 216 is formed on an internal circumference of the button hole and it may include a locking protrusion capable of being inserted into the first locking groove.

In order to move the stem button 200 in the button hole in an insertion direction to apply pressure to the tact switch 230, the first locking groove 216 can be configured to be formed as larger than a locking protrusion 215 in the insertion direction.

When a picture is captured using a camera module 121 mounted on an input unit housing 210, if the input unit housing 210 moves in the insertion direction, the picture may be blurry. Hence, it is necessary to restrict the movement moving in the insertion direction. A second locking groove 217 is formed at a position more outside than a position of the first locking groove 216 in a manner of being adjacent to the first locking groove. A height (b) of a protruding part distinguishing the first locking groove 216 from the second locking groove 217 is shallower than a depth (a) of the first locking groove 216 and the depth of the second locking groove 217.

If a user pulls the input unit housing 210 in a direction opposite to the insertion direction by applying power to the input unit housing, the locking protrusion 215 moves from the first locking groove 216 to the second locking groove 217. A width of the second locking groove 217 in the insertion direction corresponds to a size of the locking protrusion 215 and restricts a movement moving to the insertion direction. A rotation can be permitted to adjust a direction of the camera module 121.

A location sensor configured to detect a location of the locking protrusion 215 is able to detect that the locking protrusion 215 is positioned at the second locking groove 217. If the locking protrusion 215 is positioned at the second locking groove 217 in a manner that a user pulls the input unit housing 210, the camera module is activated and a function of inputting a command by pushing the stem button 200 may be restricted.

When the locking protrusion 215 is positioned at the second locking groove 217, i.e., when the camera module 121 is activated, although a rotation of the input unit housing 210 is detected by the rotation detection unit 250/255, it is recognized as not a user command by the rotation but a direction adjustment of the camera module 121.

FIG. 10

Figure 10:
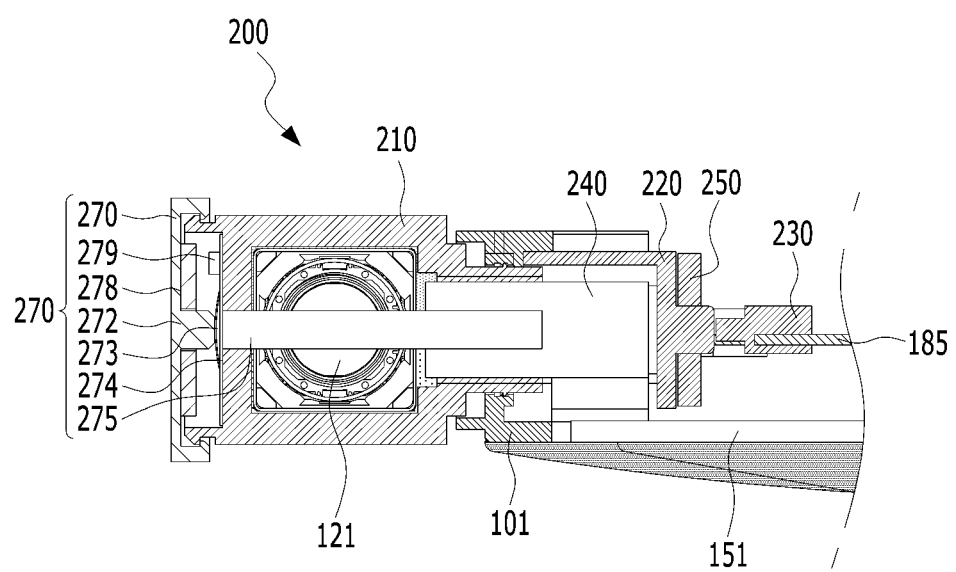
FIG. 10 is a cross section diagram for a different embodiment of a stem button of a mobile terminal according to the present invention.

FIG. 10 is a cross section diagram for a different embodiment of a stem button 200 of a mobile terminal 100 according to the present invention. When a camera module 121 is activated, if the stem button 200 is pushed or rotates, a position of the camera module 121 changes and it is difficult to capture a picture. Hence, it is necessary to restrict a use of the stem button 200 as a user input unit 123.

In a state that the camera module 121 is activated, the user input unit 123 is still necessary to control zoom-in, zoom-out, capturing and the like of the camera module 121. Hence, it may further include an auxiliary button 270. According to the present embodiment, the auxiliary button is positioned at another end of the input unit housing 210.

The auxiliary button includes a metal dome 273, a cover button 271, a button switch 274 and a button camera flexible board 245. The metal dome 273 is positioned at another end of the input unit housing 210 and is a member of a dome shape made up of metal. If a top side of the dome is pushed, the dome is pushed in a manner that a shape of the dome is changed. Yet, since the metal dome has a restoring force, when power is eliminated, the metal dome returns to an original dome shape.

The cover button 271 is combined with another end of the input unit housing 210 in a manner of being able to move a prescribed distance in an insertion direction of the input unit housing 210. If the cover button 271 is pushed, an actuator 272, which is protruding from the inside of the cover button 271 toward the input unit housing 210, applies pressure to the metal dome 273. If power is eliminated, the cover button 271 returns to an original position due to the restoring force of the metal dime 273.

If the metal dome is pushed, the button switch generates a signal. The signal generated by the button switch 274 is delivered to a main board 185 positioned at the inside of the main body 101 case via a button cable. The button cable 275 can be made up of a flexible material and can be connected with the main board 185 via the camera flexible board 245 configured to deliver a signal of the camera module 121.

The cover button 271 can be combined with the input unit housing 210 in a manner of being able to rotate. Similar to the aforementioned magnet disk 251, a south polar magnet and a north polar magnet are alternately arranged according to a circumference of a magnet disk 278 combined with the cover button 271.

When the cover button 271 rotates, the magnet disk 278 also rotates. It may further include a magnetic sensor 279 configured to detect a rotation of the magnet disk 278. Similar to the aforementioned magnetic sensor 235, the magnetic sensor is positioned at one side of the magnet disk 278 and detects a magnetic change resulted from a change of a pole of a magnet adjacent to the magnetic sensor 235. The magnetic sensor delivers the detected magnetic change to the main board 185.

When the input unit housing is not used as the camera module 121, it is able to perform 2-steps push input using the cover button 271 and the input unit housing 210 in a state that the input unit housing 210 is not pulled. As a first step, if pressure is applied to the metal dome 273 by pushing the cover button 271, it is recognized as a first push input. As a second step, if pressure is more applied to make the stem button 200 apply pressure to the tact switch 230, it is recognized as a second push input.

It may be able to control the first push input to be recognized as "OK" and it may be able to switch to a home screen in response to the second push input. And, if the first or the second push input is maintained for a long time, it might be recognized as a different input. For instance, if the first push input is maintained for more than a prescribed time, it is able to control a specific function to be executed. If the second push input is maintained for more than a prescribed time, it is able to cut the power and terminate.

Not only the push input but also a rotation of the cover button 271 or a rotation of the input unit housing 210 can be recognized as a different rotation input. When the cover button 271 rotates, it can be recognized as a first rotation input. When the input unit housing 210 rotates, it can be recognized as a second rotation input.

A size of a screen outputted on the display unit can be adjusted by zoom-in and zoom-out in response to the first rotation input. It is able to control the mobile terminal 100 to perform a scroll function moving a screen to top and bottom in response to the second rotation input.

Figure 11:
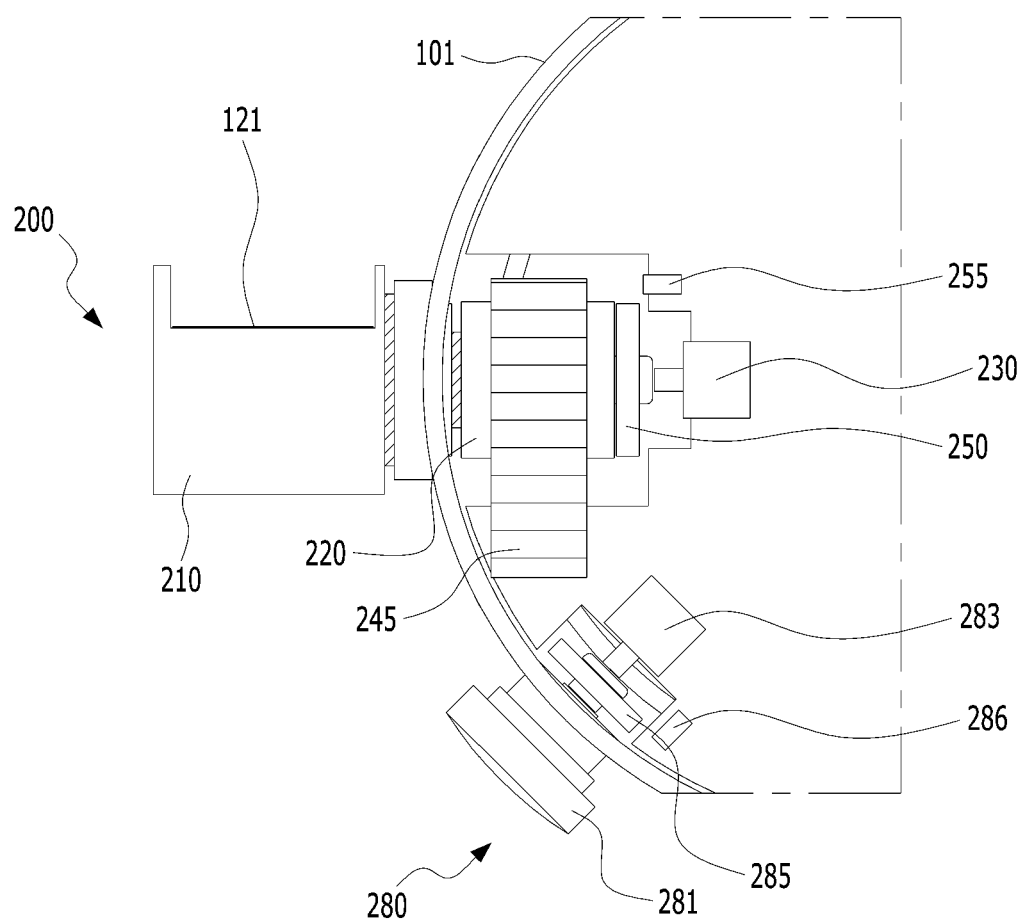
FIG. 11 is a cross section diagram for a further different embodiment of a stem button of a mobile terminal according to the present invention.

FIG. 11 is a cross section diagram for a further different embodiment of a stem button 200 of a mobile terminal 100 according to the present invention. Referring to FIG. 11, it may further include an auxiliary button 280 as a separate button.

Similar to the aforementioned input unit housing 210, the auxiliary button 280 according to the present embodiment is combined with a side of the main body 101 case. The auxiliary button is able to receive a push input and a rotation input in a manner of being combined to be able to perform a straight line motion and a rotational motion.

In particular, if performing a straight line motion is detected in a manner that the auxiliary button 280 is pushed, a push detection unit 283 generates a push input signal. If the auxiliary button 280 rotates, a rotation detection unit 286 generates a rotation input signal. The controller stores an image inputted via the camera module 121 in response to a push input of the auxiliary button 280 and the controller can control zoom-in and zoom-out of an image inputted via the camera module 121 in response to a rotation input of the auxiliary button 280 in a state that the camera module 121 is activated.

Figure 12:
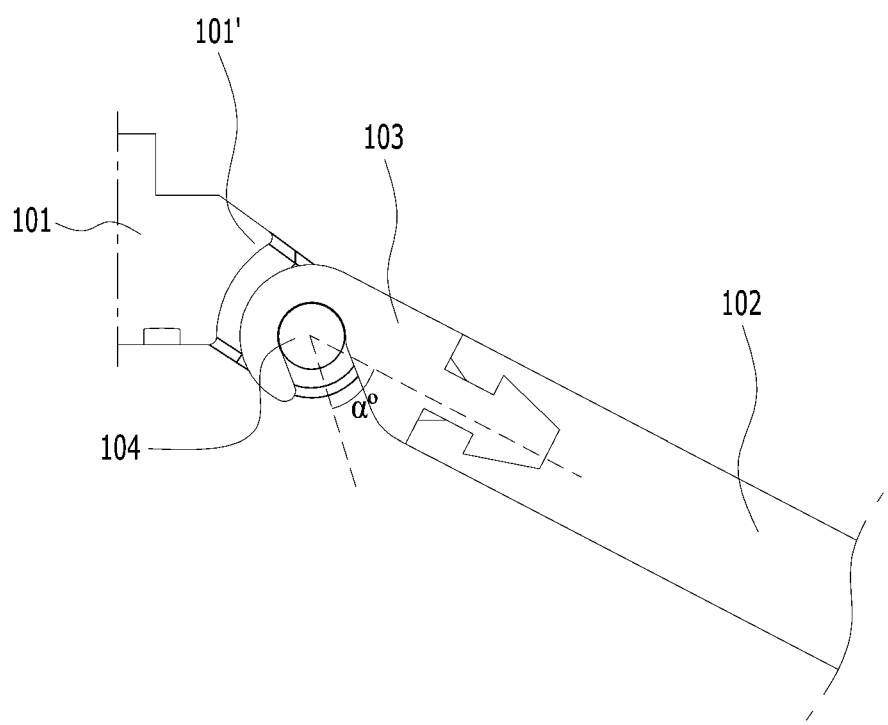
FIGS. 12 and 13 are diagrams for one embodiment of a hinge hook situating at a band part of a mobile terminal according to the present invention.
Figure 13:
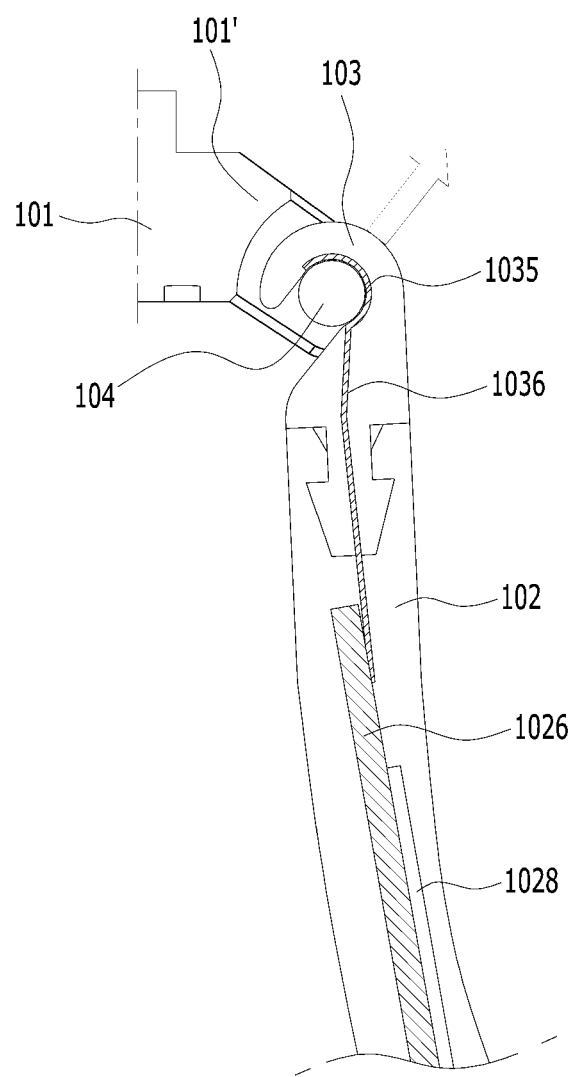

FIGS. 12 and 13 are diagrams for one embodiment of a hinge hook 103 situating at a band 102 part of a mobile terminal 100 according to the present invention. According to the present invention, the mobile terminal 100 includes a pair of bands 102 combined with a main body 101 of the mobile terminal 100. The band 102 is combined with the main body 101 using the hinge hook 103.

The hinge hook 103 includes a mounting part 1033 of a ring shape and an entrance 1031 of which one side of the mounting part is opened. A position of the opened part is slantly formed with $\alpha°$ angle on the basis of a direction in which the band 102 is extended. Both sides of the main body 101 include a hinge axis 104 of a size corresponding to an internal diameter of the hinge hook 103 to make the hinge hook 103 hang on the hinge axis. A width of the hinge axis 104 corresponds to a width of the band 102.

As shown in FIG. 12, a part combined with the hinge axis 104 of the main body 101 includes a slope inclined to a down direction. In particular, a protruding unit 101' including the slope inclined to the down direction is positioned at a side and the protruding unit 101' is able to prevent the hinge hook 103 from getting out of the hinge axis 104.

An angle ($\alpha°$) between the opened part of the hinge hook 103 and the band 102 is less than 90 degrees. The angle may vary according to a size and an angle of the protruding unit 101' positioned at the side and a size of the main body 101.

If the main body 101 is big, an angle formed by the main body 101 and the band 102 becomes small in case that a user wears the main body on a wrist of the user. If the main body 101 is small, an angle formed by the main body 101 and the band 102 is getting close to 180 degrees. Hence, if a size of the main body 101 is big, it is able to make a size of the angle ($\alpha°$) between the opened part of the hinge hook 103 and the band 102 to be small in order not to separate the main body 101 from the band 102 in a state that a user wears the main body.

As shown in FIG. 13, in order to separate the hinge hook 103 from the hinge axis, the band 102 is rotated on the basis of the hinge axis 104 to make the angle formed by the band 102 and the main body 101 to be small to make a protruding unit 1034 positioned at a side of the main body 101 not to be positioned at an opposite side of an entrance 1031 of the hinge hook 103.

The hinge axis 104 is made up of a conductive material and a conductive material can be applied to an internal side of the hinge hook 103. In particular, it may able to control a part mounted on the band 102*a* in a manner that the part mounted on the band 102 and the controller mounted on the main body 101 are connected with each other via the hinge axis and the hinge hook 103.

For instance, as shown in FIG. 13, a flexible board 1026 is mounted on the band 102 and the flexible board 1026 and a conductive material 1035 of the hinge hook 103 are electronically connected with each other. The flexible board 1026 may further include a bending detection sensor 1028 configured to detect bending of the band 102. If bending of the band 102 is detected using the bending detection sensor 1028, it may be recognized as a user is wearing the mobile terminal. Hence, it is able to activate the mobile terminal 100. An antenna, a microphone, a speaker and the like can be positioned at the band 102 as well as the bending detection sensor 1028.

Figure 14:
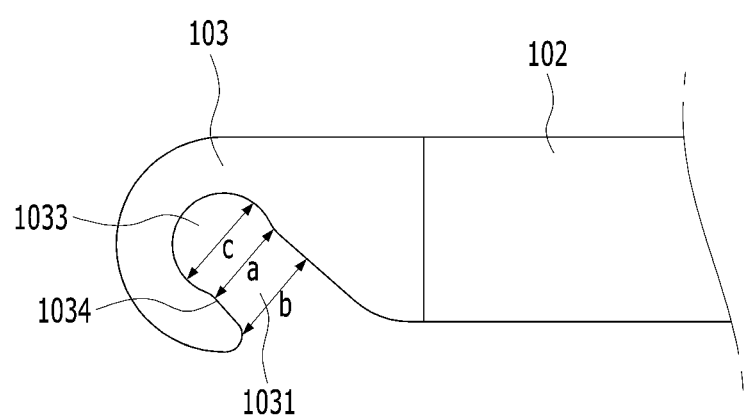
FIG. 14 is a cross section diagram for one embodiment of a hinge hook of a mobile terminal according to the present invention.

FIG. 14 is a cross section diagram for one embodiment of a hinge hook 103 of a mobile terminal 100 according to the present invention. In order to prevent the hinge hook 103 from being inadvertently separated from the hinge axis 104, as shown in FIG. 14, it may be able to include a protruding unit 1034 enabling an entrance 1031 to be narrower as getting closer to a mounting part 1033 and to be wider again. A width (b) of an entrance part of the entrance 1031 is getting narrower (a) and the width is getting wider at the mounting part 1033 (*d*). Since the width (a) of a part at which the protruding unit 1034 is positioned is narrowest, if a user adds power to force the hinge axis 104 to be inserted into the mounting part 1033, the hinge axis 104 may pass through the protruding unit 1034.

Figure 15:
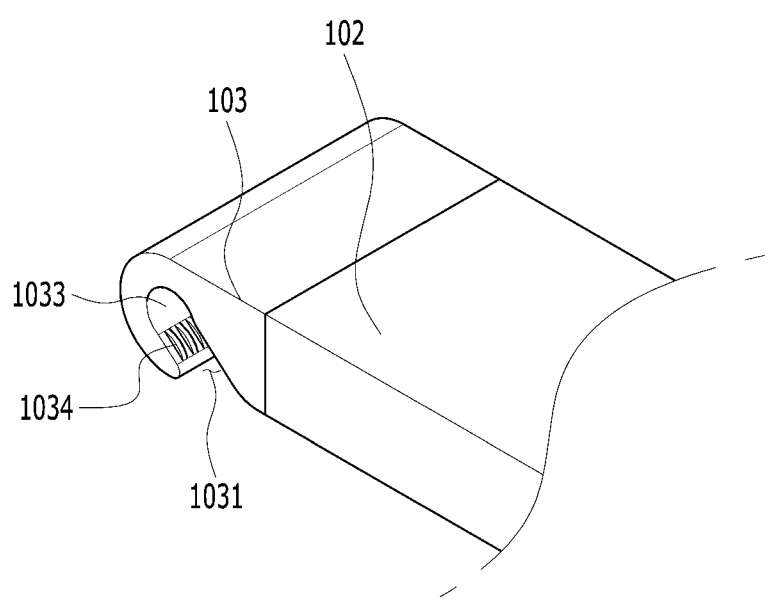
FIG. 15 is a perspective diagram for a hinge hook shown in FIG. 14.

FIG. 15 is a perspective diagram for a hinge hook 103 shown in FIG. 14. Although a protruding unit 1034 may be formed in a continuous fashion, a plurality of protruding units can be separately formed in a width direction of the band 102 to appropriately adjust frictional force.

Figure 16:
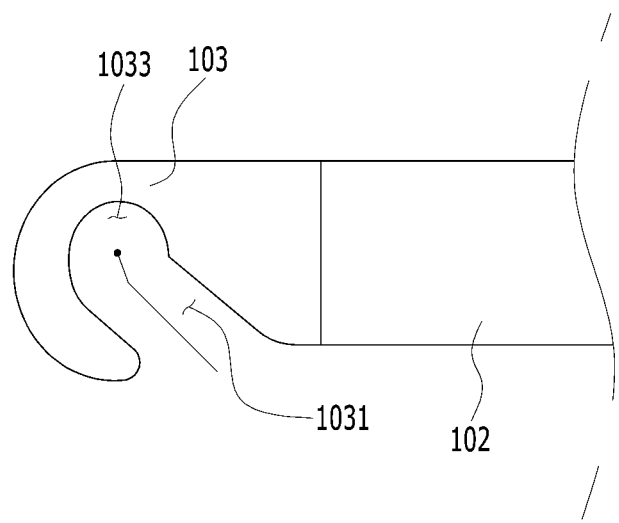
FIG. 16 is a cross section diagram for a different embodiment of a hinge hook of a mobile terminal according to the present invention.

FIG. 16 is a cross section diagram for a different embodiment of a hinge hook 103 of a mobile terminal 100 according to the present invention. Instead of the protruding unit 1034, a center of an entrance 1031 and a center of a mounting part 1033 are not on an identical straight line. If the center of the entrance 1031 and the center of the mounting part 1033 are not on the identical straight line, power of two directions should be continuously applied to pull out the hinge axis 104 from the mounting part 1033 via the entrance 1031. Hence, it is able to prevent the hinge axis 104 from being inadvertently separated from the mounting part 1033.

Figure 17:
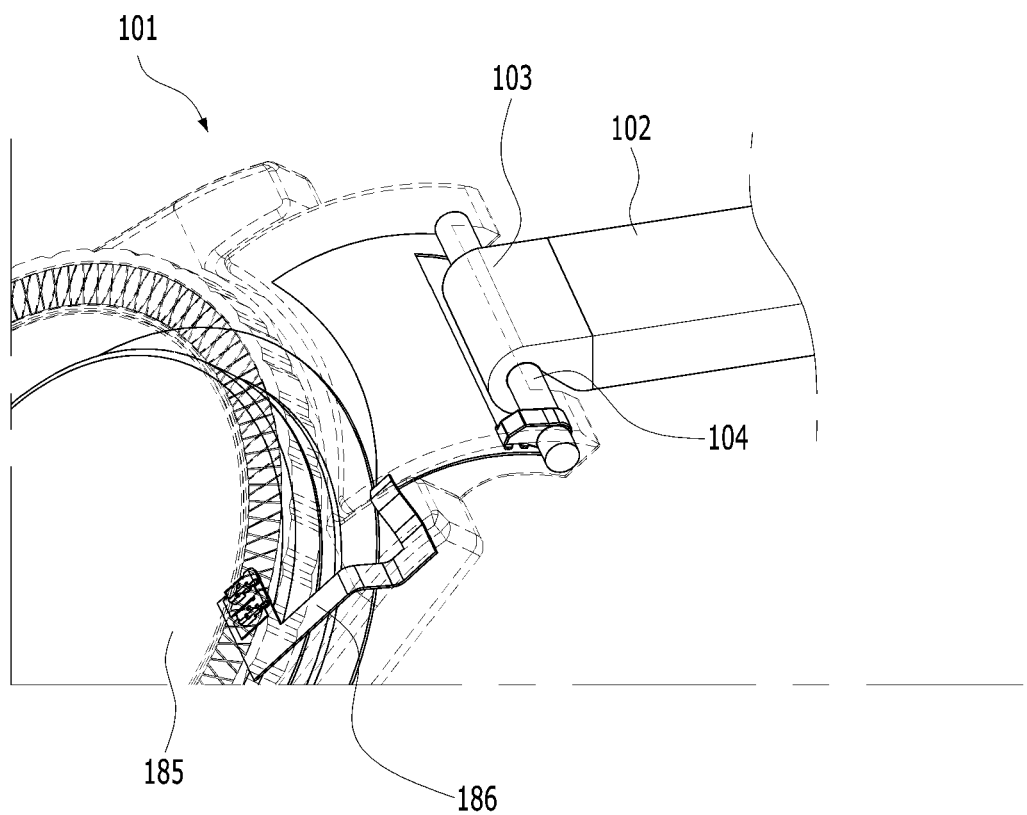
FIG. 17 is a three-dimensional diagram for combination of a hinge hook and a hinge axis of a mobile terminal according to the present invention.

FIG. 17 is a three-dimensional diagram for combination of a hinge hook 103 and a hinge axis 104 of a mobile terminal 100 according to the present invention. As mentioned in the foregoing description, it may be electronically connected via the hinge axis 104 and the hinge hook 103. The hinge axis can be connected via a main board 185 and a flexible board 186.

Figure 18:
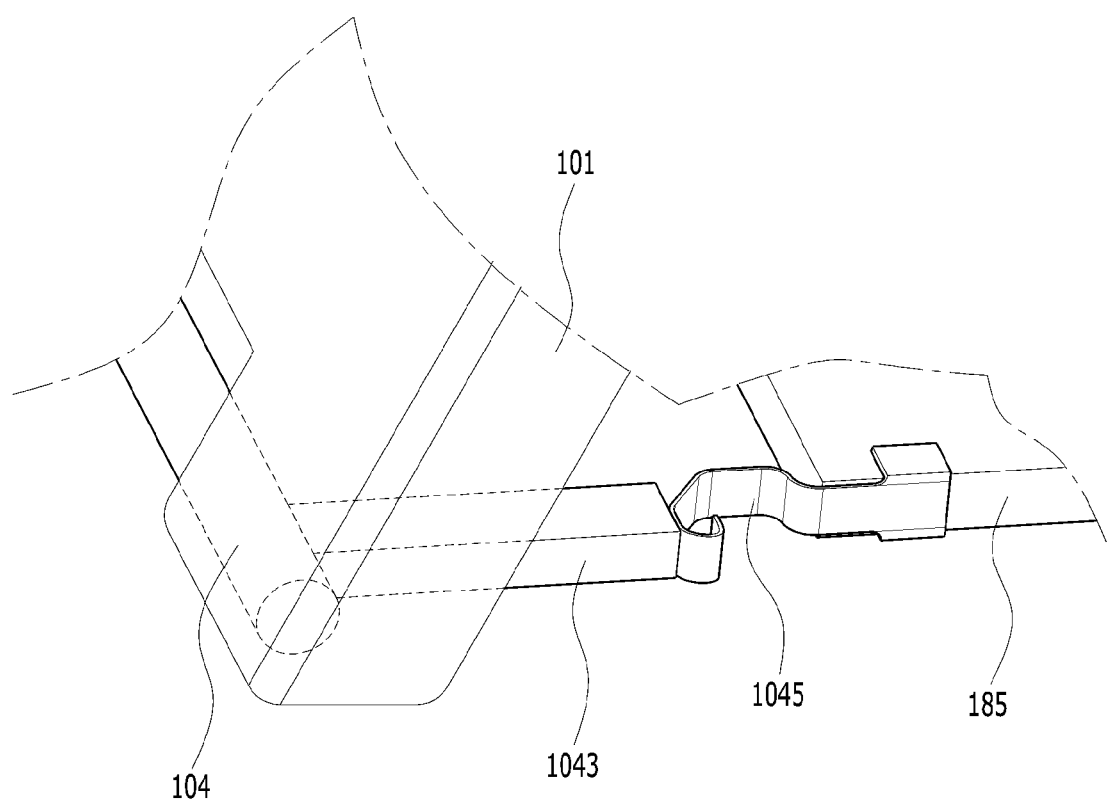
FIG. 18 is a diagram for one embodiment of a hinge axis and a main board of a mobile terminal according to the present invention.

Or, as shown in FIG. 18, both ends of the hinge axis 104 are extended to the inside of a main body 181 case. An access unit 1043 extended from the both ends of the hinge axis 104 and the main board 185 can be connected with each other using a C clip 1045.

Figure 19:
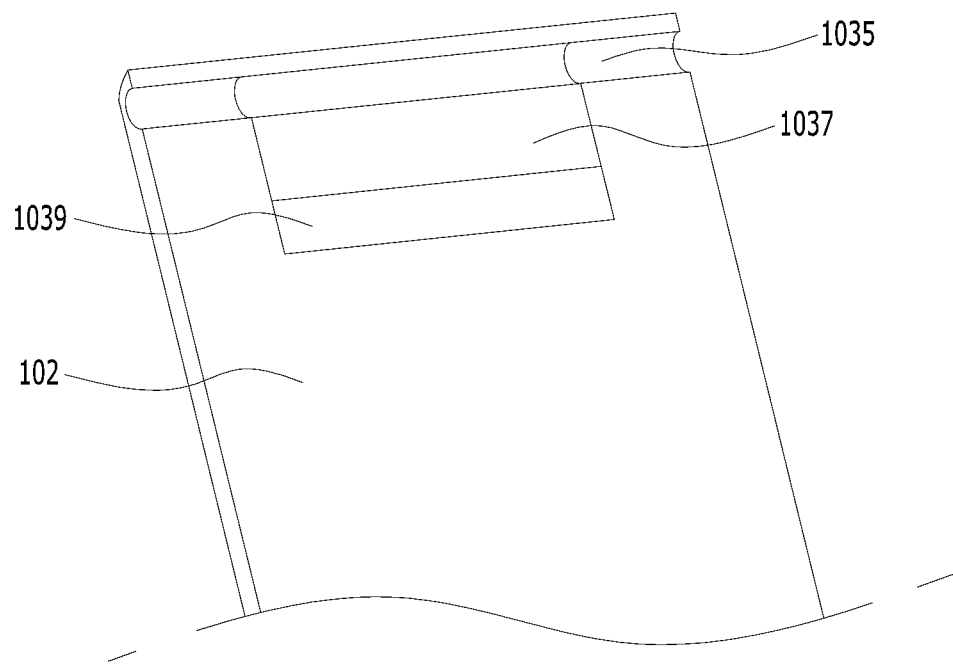
FIG. 19 is a cross section diagram for one embodiment of a band of a mobile terminal according to the present invention.

Meanwhile, if a resistance is connected to the hinge hook 103 which is combined with the hinge axis 104, a type of a band 102 can be determined by detecting resistance change of the both ends of the hinge axis 104. FIG. 19 is a cross section diagram for one embodiment of a band 102 of a mobile terminal 100 according to the present invention. The band can include a reinforced mold positioned at the inside of the hinge hook 103 and an internal resistance 1039.

In order to electronically connect with the hinge axis 104, a conductive material is applied to a mounting part 1033 of the hinge hook 103. As the conductive material, it may use a reinforced mold 1037 made up of metal. The reinforced mold 1037 is connected with a resistance positioned at the inside of the band 102 and plays a role of reinforcing hardness of the hinge hook 103.

A material of high resistance is used for the internal resistance 1039. If the internal resistance 1039 having a different resistance value according to a type of the band 102 is used, a user may be able to aware of a type of the band 102 combined with the hinge axis 104.

For instance, in case of a band 102 made up of a silicon material configured to prevent the band from absorbing sweat, the band 102 can execute such an application as a heart rate measuring instrument, a distance measuring instrument, a speed measuring instrument and the like as a band 102 for the use of sport. In case of wearing a leather band 102 or a metal band 102, a screen of the mobile terminal may be switched to a watch screen and it is able to control the watch screen to be maintained in idle state.

Figure 20:
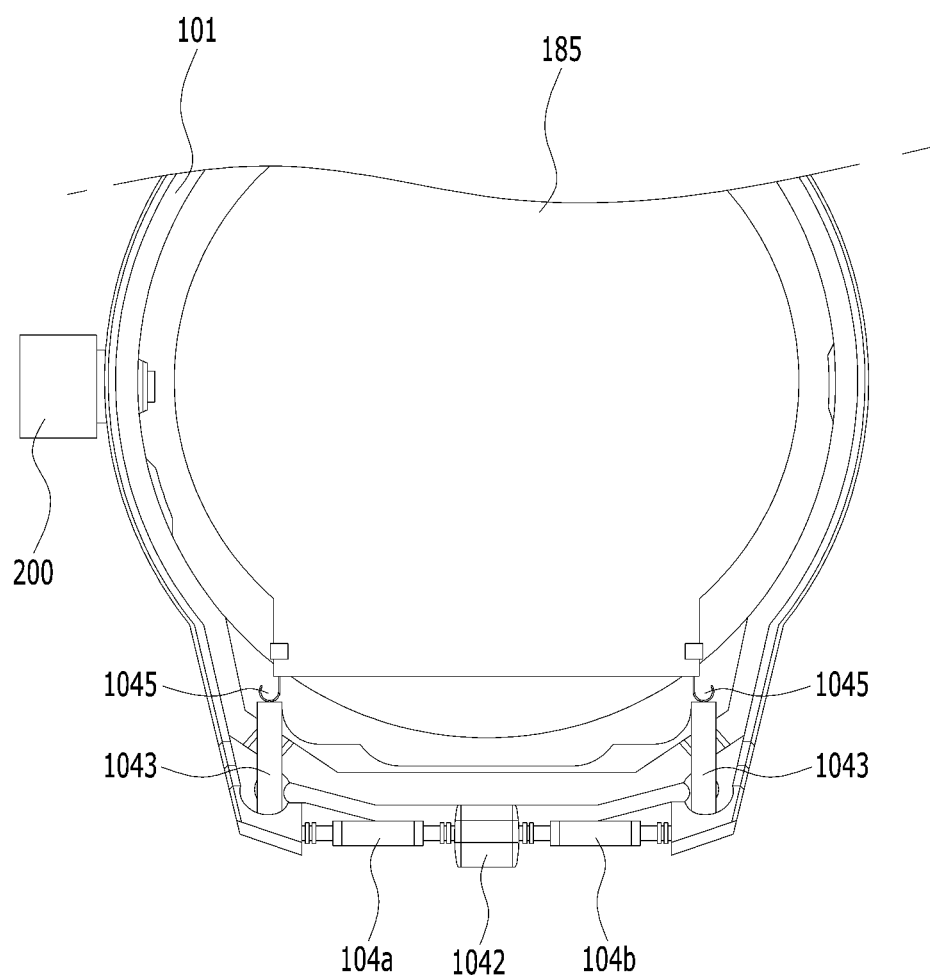
FIG. 20 is a diagram for a different embodiment of a hinge axis and a main board of a mobile terminal according to the present invention.
Figure 21:
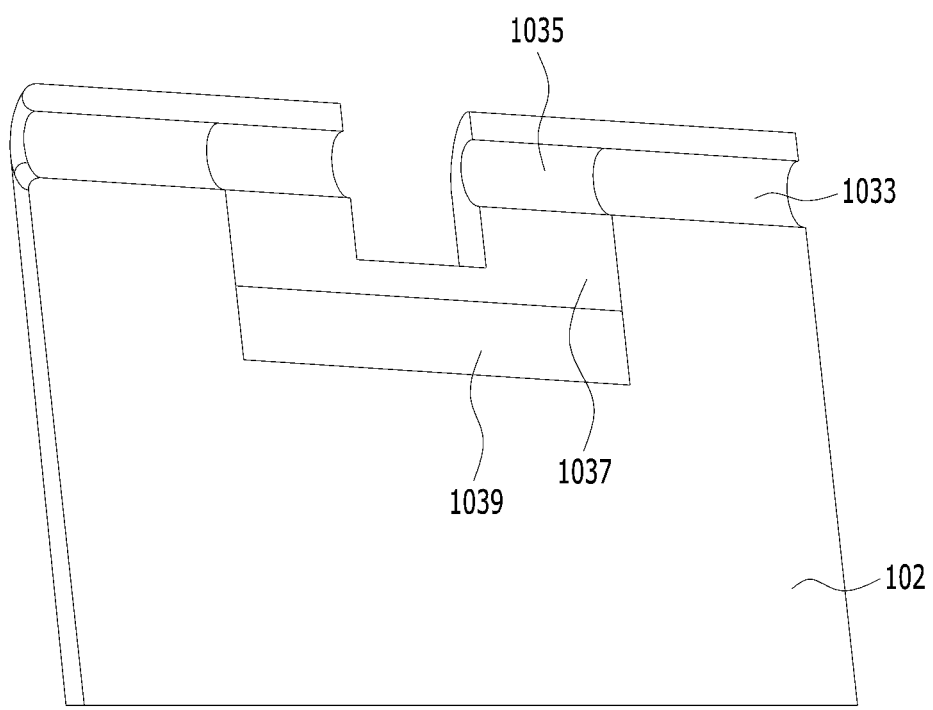
FIG. 21 is a cross section diagram for a different embodiment of a band of a mobile terminal according to the present invention.

FIG. 20 is a diagram for a different embodiment of a hinge axis 104 and a main board 185 of a mobile terminal 100 according to the present invention and FIG. 21 is a cross section diagram for a different embodiment of a band 102 of a mobile terminal 100 according to the present invention.

As shown in FIG. 20, the hinge axis 104 can be divided into two hinge axes. One hinge axis 104 of the two hinge axes is connected with a main board 185 via an access unit 1043. Yet, the two hinge axes are not connected with each other and are in a state of being electronically cut off. In particular, a pair of access units 1043 is in a shorted state.

In this case, if a user hangs the hinge hook 103 on the hinge axis 104, a pair of the hinge axes 104 is electronically connected with each other and it is able to check that a band 102 is combined with the hinge axis. As shown in FIG. 21, in order to make a separation unit 1042 to be positioned between the two hinge axes 104, the hinge hook 103 can be divided into two hinge hooks 103 in a manner of forming a slit on a position corresponding to a position of the separation unit 1042.

The two hinge hooks 103 can be electronically connected with each other via a reinforced frame. If the two hinge hooks are combined with the hinge axis 104, a pair of the hinge axes 104 is electronically connected with a reinforced mold 1037 via an internal resistance 1039. As mentioned in the foregoing description, since an internal resistance value varies according to a type of the band 102, it is able to control a mobile terminal 100 in accordance with a resistance value between the access units 1043.

As mentioned in the above, according to at least one or more embodiments, an input function can be expanded using a step button 200 of a mobile terminal 100. And, the number of parts mounted on a main body 101 can be reduced in a manner of mounting a camera module 121 on the stem button 200. Since a band 102 is easily replaceable, a band 102 can be replaced according to a mood of a user or a request of a user. In case of replacing a band 102 with a different band, it is able to execute an appropriate function by identifying a purpose of the different band, thereby increasing user convenience.

Figure 22:
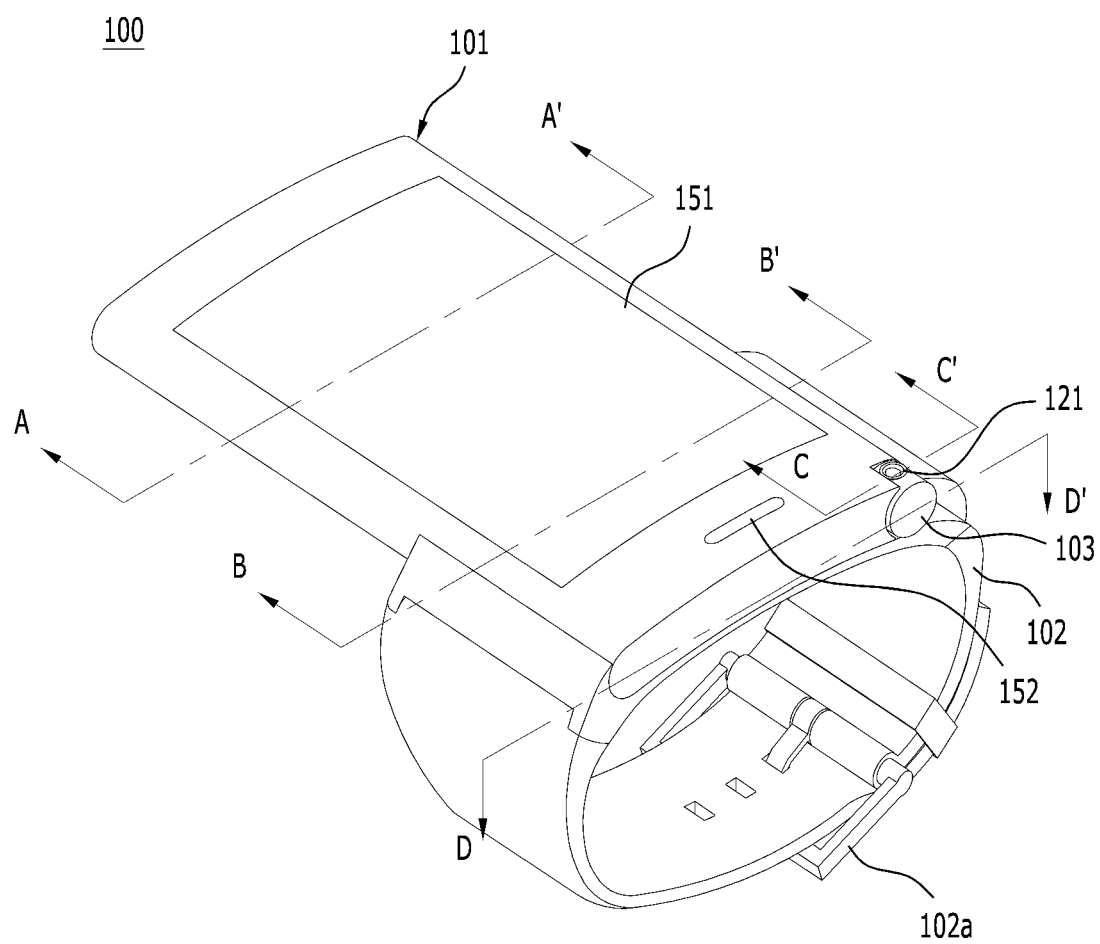
FIG. 22 is a diagram for a front direction of a mobile terminal according to one embodiment of the present invention.

FIG. 22 is a conceptual diagram for a mobile terminal viewed from one direction of the mobile terminal according to present invention.

In the present embodiment, a main body of the mobile terminal 100 includes a curved surface of which a center of the curved surface is convex in a first direction corresponding to a direction in which a band 102 is extended. In particular, the main body forms a curved surface in a shape corresponding to a shape of a wrist of a user. In case of forming the curved surface, an area of a display unit 151 of the curved surface may become larger than an area of a display unit 151 of a flat surface. And, since the curved surface is bent according to a shape of a wrist, wearing sensation can be enhanced.

Figure 23:
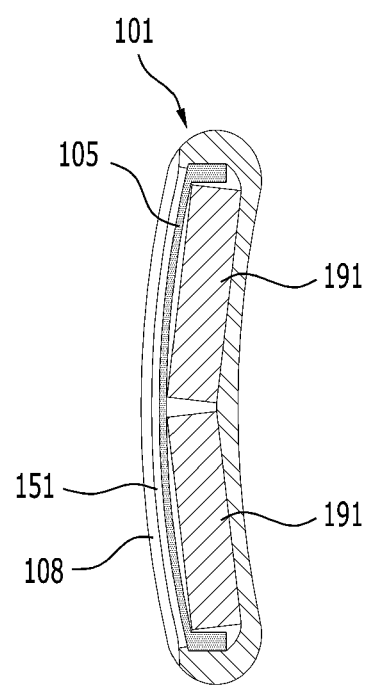
FIG. 23 is A-A' cross section diagram of FIG. 22.
Figure 24:
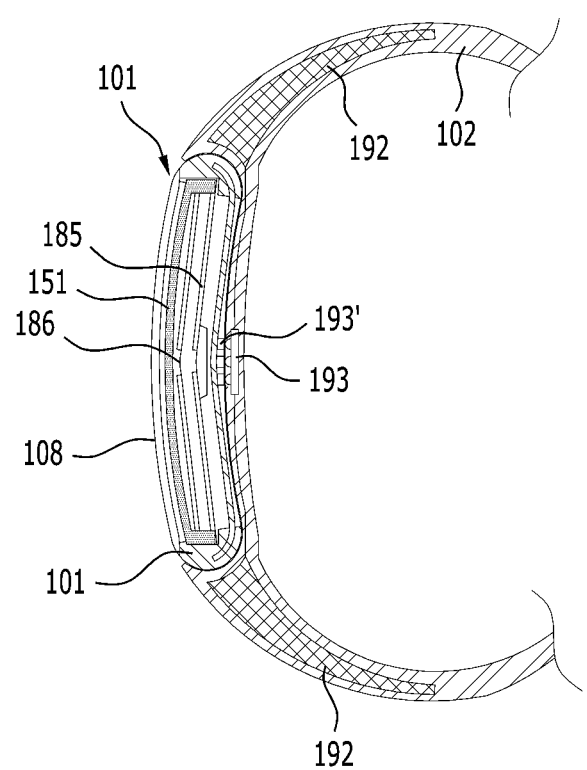
FIG. 24 is B-B' cross section diagram of FIG. 22.
Figure 25:
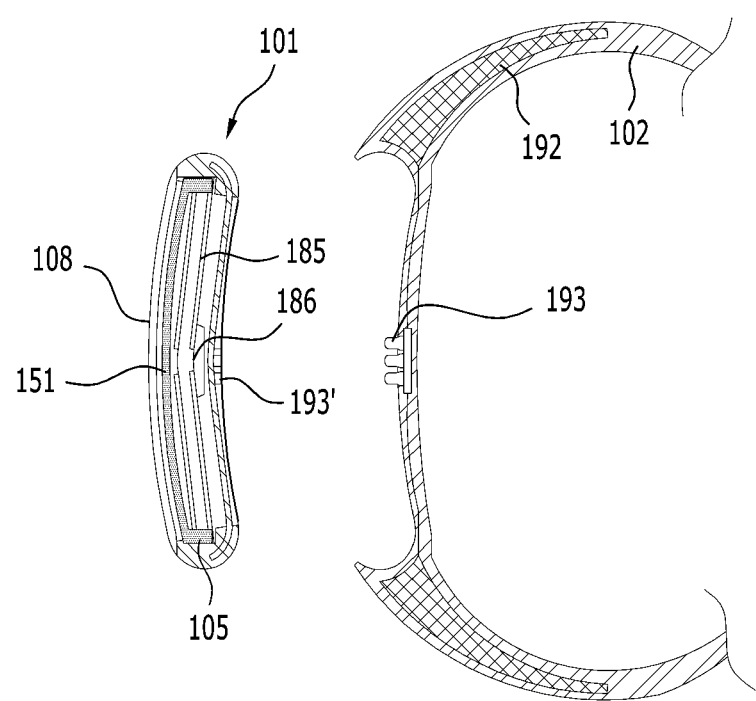
FIG. 25 is a cross section diagram for a watch type mobile terminal according to the present invention showing a state that a main body is separated from a band.

FIGS. 23 to 25 are cross section diagrams of a main body 101. FIGS. 23 to 25 show a main battery 191 mounted on the main body 101 and a printed circuit board 185. The main battery 191 and the printed circuit board 185 are arranged to a bent surface in a manner of being divided into a plurality of batteries and printed circuit boards to be mounted on the inside of the main body consisting of a curved surface. In the drawing, although two printed circuit boards 185 and two main batteries 191 are arranged, the printed circuit board and the main battery can be more divided to be arranged to the curved main body. A plurality of printed circuit boards 185 or a plurality of main batteries 191 can be connected with each other using a flexible printed circuit board 186.

Since a mobile terminal 100 is worn on a wrist, there may exist a limitation on making a voice call, capturing a picture and the like. And, when the mobile terminal is operated by a single hand only, there may exist a limitation as well. As shown in FIG. 24 and FIG. 25, since the mobile terminal 100 according to the present invention is able to attach/detach a main body 101 to/from the mobile terminal by forming a mounting part on a band 102, in case of making a call, a user can make a call while holding the mobile terminal to the user's ear just like a general mobile terminal 100. Moreover, the mobile terminal 100 can be operated by both hands such as playing a game or inputting a text using a QWERTY keyboard in a manner that the main body 101 is separated from the mobile terminal 100.

And, the main body 101 can be formed in a manner of being extended to a second direction heading to an arm of a user in consideration of a distance between a mouth and an ear of the user when the user makes a call. If the main body is extended in a first direction, since the main body is widened to a side of the arm, it may be inconvenient for the user to wear the main body. Hence, if the main body is extended to the direction heading to the arm, since the main body 101 is not deviated from a body of the user, inconvenience of use can be reduced.

If a size of the main body 101 is enlarged, a wider display unit 151 can be provided compared to a display unit of a legacy mobile terminal 100 and a function capable of being implemented in the mobile terminal 100 itself may increase. Moreover, if the size of the main body 101 is enlarged, a type of a part capable of being mounted on the main body and a size of a battery can also increase. Hence, hours of use of the mobile terminal 100 can be extended.

Figure 26:
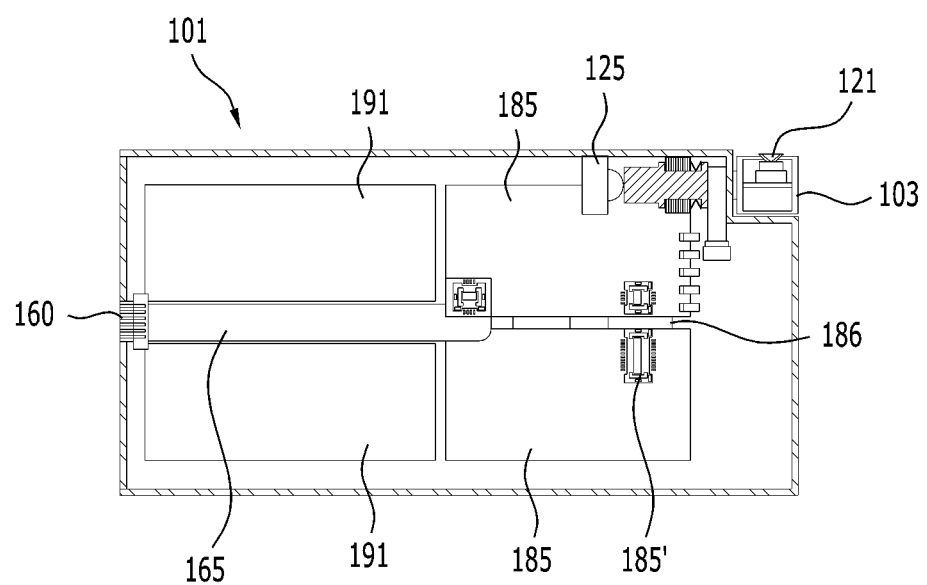
FIG. 26 is D-D' cross section diagram of FIG. 22.

FIG. 26 is D-D' cross section diagram of FIG. 22 and shows parts mounted on an electronic apparatus unit. A pair of main batteries 191 and a pair of printed circuit boards arranged in a first direction (up/down direction in the drawing) are shown in FIG. 26. A pair of the printed circuit boards is connected with each other using a flexible printed circuit board 186. The flexible printed circuit board can also be used as a connection unit 165 configured to connect an interface unit 160 formed on an end of the mobile terminal 100 and the printed circuit board 185 with each other. Various connectors 185' mounted on the printed circuit board 185 can be used to connect parts mounted on the electronic apparatus unit with each other.

As shown in FIG. 24 and FIG. 25, the band 102 can be further equipped with an auxiliary battery 192 to extend hours of use of the mobile terminal. In particular, if power is remained in the auxiliary battery 192, power can be supplied from the auxiliary battery to make charge amount of the main battery 191 situating at the main body 101 to be higher than a prescribed level. The power of the auxiliary battery 192 can be supplied to the main battery 191 mounted on the main body 101 via a power terminal 193 situating at the mounting part and an access terminal 193' situating at a rear side of the main body 101 corresponding to a position of the power terminal 193.

Referring to FIG. 22 and FIG. 26, a user input unit is positioned at an end of one side. The user input unit of a cylinder shape, which is hinge-combined with the main body 101 on the basis of an arm direction, i.e., a second direction, at one side of the main body 101 of the mobile terminal, can capture a picture/video and can input a user command.

Figure 27:
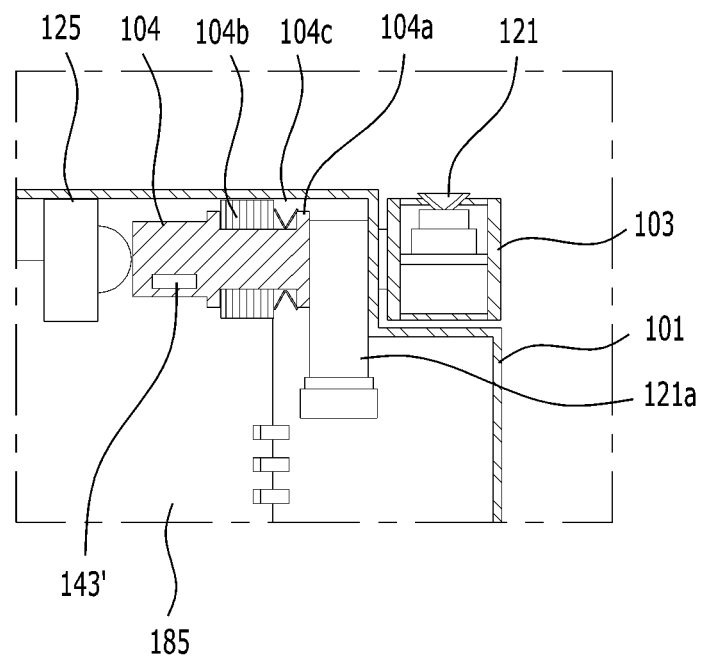
FIG. 27 is a diagram for a user input unit enlarged from the user input unit shown in FIG. 26.
Figure 28:
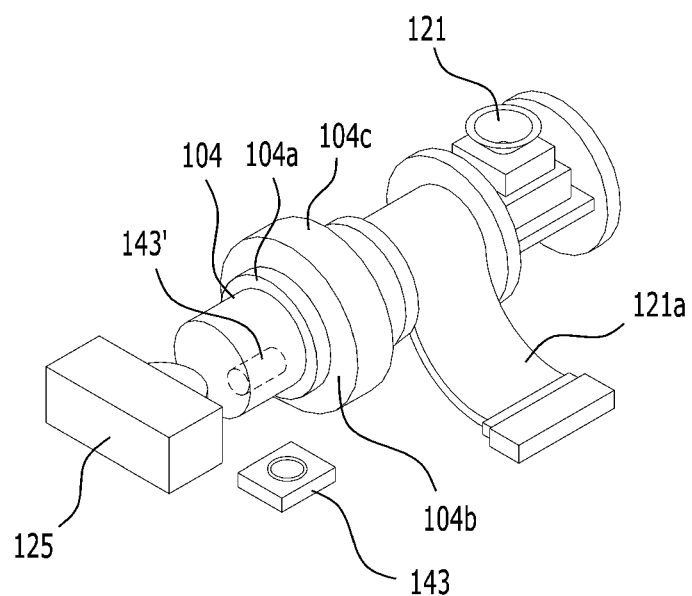
FIG. 28 is a conceptual diagram for a user input unit, a switch and a sensor of a mobile terminal according to one embodiment of the present invention.

FIG. 27 is a diagram for a user input unit enlarged from the user input unit shown in FIG. 26 and FIG. 28 is a conceptual diagram for a user input unit, a switch and a sensor of a mobile terminal according to one embodiment of the present invention.

Referring to FIG. 27 and FIG. 28, the user input unit includes a housing 103 of a cylinder shape, a camera 121 positioned at the inside of the housing and a shaft 104 of which one end of the shaft is positioned at the main body 101 in a manner of being extended from the user input unit for hinge combination.

The housing 103 of the cylinder shape forms an opening on a curved surface, i.e., a side, to expose the camera 121. The camera 121 receives a light from external via the opening and may be able to rotate on the basis of the shaft 104, which is combined in a length direction of the housing 103.

Figure 29:
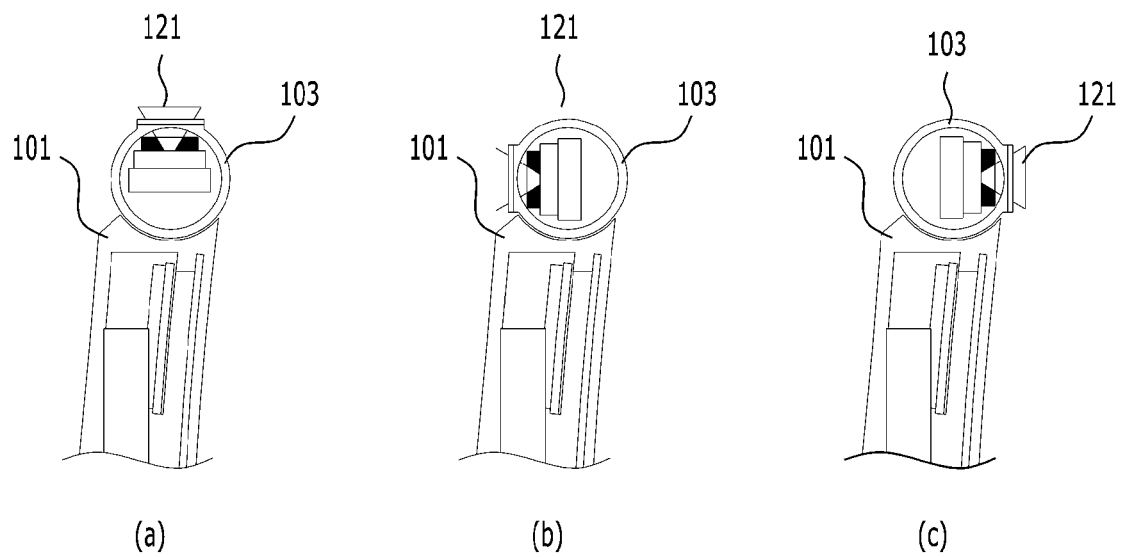
FIGS. 29(a), 29(b) and 29(c) are C-C' cross section diagram of FIG. 22.

FIG. 29 is C-C' cross section diagram of FIG. 22. As shown in FIG. 29 (*a*), a user input unit can rotate to make a camera 121 face a front side of a main body 101 for a selfie or a video call. Or, as shown in FIG. 29 (*b*), the user input unit can rotate to make the camera 121 face a side of the main body 101 to capture a direction except a user direction in a state that the main body 101 is combined with the band 102. Or, as shown in FIG. 29 (*c*), the user input unit can rotate to make the camera 121 face a rear side of the main body 101 in order for a user to capture a picture while watching a display unit 151 by separating the main body 101 from the band 102.

Image information inputted from the camera 121 is delivered to a printed circuit board 185 mounted on the main body 101. As shown in FIG. 28, since the user input unit rotates, the user input unit can be connected with the printed circuit board 185 of the main body 101 using a flexible printed circuit board 121*a*.

The user input unit not only captures a picture but also inputs a command of a user. The user input unit can recognize a volume control command, a command of turning over continuous screens in left and right, a command of searching for a plurality of files and the like by detecting a rotation of a shaft 104.

As an example of detecting a rotation of the shaft 104, the user input unit can detect the rotation of the shaft 104 in a manner of installing a hole sensor 143 in a position in the vicinity of the shaft 104, installing a magnet 143' in the shaft 104 and detecting an electromagnetic field which is changing when the shaft 104 rotates. The magnet is positioned at one side of the shaft on the basis of an axis of the shaft 104 and may be able to detect the rotation of the shaft in a manner of detecting a change of distance from the hole sensor 143 when the shaft rotates.

And, the user input unit can be used as a button configured to input a command of a user by pushing the user input unit in a second direction. As shown in FIG. 29, if a switch 125 is positioned at an end of the shaft 104 and the user input unit is pushed in the second direction, a signal is generated. Examples of the switch 125 may include a pogo pin and a metal dome.

One end of the shaft 104 may further include a locking protrusion 104*a*, which is protruded on a circumference of the shaft 104 to prevent the shaft from being pulled out from the main body 101. It may further include a supporting unit 104*c* positioned at the circumference of the shaft 104 to make the shaft 104 rotate in the electronic apparatus unit of the main body 101 and move as much as a prescribed distance in the second direction. As shown in FIG. 28, the supporting unit 104*c* can be formed by a ring shape or may be formed by a partial ring shape.

A size of an opening positioned at the center of the supporting unit 104*c* corresponds to a size of the circumference of the shaft 104. The opening can be formed by a size smaller than the locking protrusion 104*a*. After the shaft 104 is pushed, the shaft returns to an original position with the help of restoring force of a pogo pin or a metal dome. Yet, in order to assist the restoring force, a flat spring 104*b* can be installed between the locking protrusion 104*a* and the supporting unit 104*c*.

As mentioned in the foregoing description, according to at least one or more embodiments of the mobile terminal 100 of the present invention, since a shape of a main body 101 corresponds to a curved surface, wearing sensation is enhanced and a size of a display unit 151 can be enlarged.

And, since a main body is removable from a band 102, convenience is increased in case of making a call or capturing a picture and utilization of the mobile terminal 100 can be increased. And, a function of a mobile terminal 100 can be expanded in a manner of enlarging a display unit 151 by expanding a size of a main body 101 and securing a bigger electronic apparatus unit.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a main body case having a button hole formed through a side of the main body case;
   a user input unit configured to detect an input of a control command; and
   a controller responsive to the control command detected by the user input unit,
   wherein the user input unit comprises:
   an input unit housing inserted through the button hole and configured to rotate about an axis parallel to an insertion direction of the input unit housing, a rotation detection unit configured to detect a rotation of the input unit housing and deliver a rotation input signal to the controller, and a camera module mounted on the input unit housing.

2. The mobile terminal of claim 1, further comprising:
a camera connector connected to the camera module and extending inside the main body by passing through the button hole; and
a camera flexible board connecting the camera connector and the controller with each other.

3. The mobile terminal of claim 2, further comprising a key housing having a cylindrical shape combined with the input unit housing inside of the main body,
wherein the camera flexible board is configured to spirally wind around the outside of the key housing.

4. The mobile terminal of claim 1, wherein the rotation detection unit comprises a magnet disk connected to an end of the input unit housing and configured to rotate together with the input unit housing, and having a plurality of north polar magnets and a plurality of south polar magnets alternately arranged along a circumference of the magnet disk, and
a magnetic sensor configured to detect a change in a magnetic field according to a change in the position of the south polar magnets and the north polar magnets when the magnet disk rotates,
wherein the controller is configured to calculate a rotation angle or the number of rotations of the input unit housing based on the change of the magnetic field detected by the magnetic sensor.

5. The mobile terminal of claim 4, wherein if pressure is applied to the input unit housing in the insertion direction, the input unit housing is inserted into the main body case and wherein the mobile terminal further comprise a push detection unit configured to transfer a push input to the controller when the input unit housing is inserted into the main body case.

6. The mobile terminal of claim 4, wherein the push detection unit corresponds to a tact switch positioned in the vicinity of an inner end of the input unit housing and wherein if pressure is applied to the input unit housing in the insertion direction, the inner end of the input unit housing is configured to push the tact switch and generate a signal.

7. The mobile terminal of claim 4, further comprising a touch sensor configured to be positioned on an opposite side to the button hole of the main body case,
wherein if the touch sensor detects a body contact, the controller is configured to activate the push detection unit.

8. The mobile terminal of claim 5, further comprising;
a locking protrusion formed on a circumference of one side of the input unit housing; and
a first locking groove to which the locking protrusion is inserted in the inside of a button hole,
wherein a size of the first locking groove is greater than a size of the locking protrusion toward the insertion direction of the input unit housing and wherein the locking protrusion moves in the inside of the first locking groove according to a movement of the input unit housing.

9. The mobile terminal of claim 8, further comprising a second locking groove formed on the button hole in the vicinity of the first locking groove,
wherein a height of a protruding part between the first locking groove and the second locking groove is smaller than a depth of the locking groove.

10. The mobile terminal of claim 9, further comprising a location sensor configured to detect whether the locking protrusion is positioned at the first locking groove or the second locking groove,
wherein if the location sensor detects the locking protrusion positioned at the second locking groove, the controller is configured to activate a camera.

11. The mobile terminal of claim 1, further comprising:
a metal dome positioned at an outer end of the input unit housing;
a cover button combined with the outer end of the input unit housing and configured to apply pressure to the metal dome when pressure is applied in the insertion direction of the input unit housing;
a button switch configured to generate a signal when the pressure is applied to the metal dome; and
a button cable configured to transfer the signal generated by the button switch in a manner that one end of the button cable is connected with the button switch and another end of the button cable is connected with a camera flexible board.

12. The mobile terminal of claim 11, further comprising:
a magnet disk having a plurality north polar magnets and a plurality south polar magnets alternately positioned along a circumference of the magnet disk, the magnet disk combined with the cover button to rotate together with the cover button when the cover button rotates; and
a magnetic sensor configured to detect a change in a magnetic field according to a change in the position of the south polar magnets and the north polar magnets when the magnet disk rotates,
wherein the controller is configured to calculate a rotation angle or the number of rotations of the cover button based on the change of the magnetic field detected by the magnetic sensor.

13. The mobile terminal of claim 1, further comprising an auxiliary button rotatably inserted into the side of the main body case, the auxiliary button capable of moving in an insertion direction of the auxiliary button within a prescribed range and rotating about an axis parallel to an insertion direction of the auxiliary button,
wherein the auxiliary button further comprises a rotation detection unit configured to detect a rotation and a push detection unit configured to detect pressure in the insertion direction of the auxiliary button,
wherein if the rotation detection unit detects a rotation of the auxiliary button in a state that a camera is activated, the controller is configured to adjust a focus of the camera, and
wherein if the push detection unit detects pressure applied to the auxiliary button in the insertion direction, the controller is configured to store an image inputted by the camera.

14. The mobile terminal of claim 1, wherein the main body case comprises a convex surface,
the mobile terminal further comprising:
a plurality of printed circuit boards arranged to on the inside of the main body case in a manner of being separated from each other in a first direction;
a flexible board connecting each of a plurality of the printed circuit boards with each other and bent according to a shape of the main body; and
a band combined with both sides of the main body case in the first direction.

* * * * *